(12) United States Patent
McEldowney

(10) Patent No.: US 10,712,576 B1
(45) Date of Patent: Jul. 14, 2020

(54) PUPIL STEERING HEAD-MOUNTED DISPLAY

(71) Applicant: Facebook Technologies, LLC, Menlo Park, CA (US)

(72) Inventor: Scott Charles McEldowney, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/169,291

(22) Filed: Oct. 24, 2018

Related U.S. Application Data

(60) Provisional application No. 62/576,559, filed on Oct. 24, 2017.

(51) Int. Cl.
*G09G 5/00* (2006.01)
*G02B 27/01* (2006.01)
*G06F 3/01* (2006.01)
*G03H 1/22* (2006.01)
*G02B 27/00* (2006.01)

(52) U.S. Cl.
CPC ..... *G02B 27/0179* (2013.01); *G02B 27/0093* (2013.01); *G02B 27/0172* (2013.01); *G02B 27/0176* (2013.01); *G03H 1/2294* (2013.01); *G06F 3/013* (2013.01); *G02B 2027/0156* (2013.01)

(58) Field of Classification Search
CPC ............ G02B 27/0093; G02B 27/0172; G02B 27/0176; G02B 27/0179; G02B 2027/0156; G06F 3/013; G03H 1/2294
See application file for complete search history.

(56) References Cited

U.S. PATENT DOCUMENTS

| | | | | |
|---|---|---|---|---|
| 6,700,552 | B2* | 3/2004 | Kollin | G02B 26/101 345/7 |
| 10,140,695 | B2* | 11/2018 | Wilson | G06T 5/50 |
| 10,373,294 | B1* | 8/2019 | Wilson | G06T 11/00 |
| 10,423,222 | B2* | 9/2019 | Popovich | G06F 3/013 |
| 2001/0011968 | A1* | 8/2001 | Tidwell | G02B 7/287 345/8 |
| 2010/0149073 | A1* | 6/2010 | Chaum | G02B 27/0093 345/8 |
| 2012/0139817 | A1* | 6/2012 | Freeman | G02B 27/0101 345/8 |
| 2016/0270656 | A1* | 9/2016 | Samec | A61B 3/085 |
| 2017/0068091 | A1* | 3/2017 | Greenberg | G06F 3/013 |
| 2018/0045960 | A1* | 2/2018 | Palacios | G02B 27/017 |

(Continued)

*Primary Examiner* — Joe H Cheng
(74) *Attorney, Agent, or Firm* — Kilpatrick Townsend & Stockton LLP

(57) ABSTRACT

Disclosed herein are techniques for steering the eye box or exit pupil of a near-eye display device based on a location of the pupil of a user's eye. The near-eye display system includes an image projector, a deflector, and a relay optical subsystem. The image projector is configured to form an image of a computer-generated image on an image plane. The deflector is located at or near the image plane and is configurable based on a location of a pupil of a user's eye to deflect incident light from the image to a corresponding direction. The relay optical subsystem relays the image deflected by the deflector to an exit pupil of the near-eye display system, where the location of the exit pupil at least partially overlaps with the location of the pupil of the user's eye.

18 Claims, 15 Drawing Sheets

(56) References Cited

U.S. PATENT DOCUMENTS

| 2018/0246336 A1* | 8/2018 | Greenberg | G02B 27/0172 |
| 2018/0367769 A1* | 12/2018 | Greenberg | G02B 27/0172 |
| 2019/0287495 A1* | 9/2019 | Mathur | G09G 5/391 |

* cited by examiner

1300

PUPIL STEERING HEAD-MOUNTED DISPLAY

CROSS-REFERENCE TO RELATED APPLICATIONS

The present application claims the benefit of and priority to U.S. Provisional Patent Application No. 62/576,559, filed on Oct. 24, 2017, entitled "PUPIL STEERING HEAD-MOUNTED DISPLAY," the entire content of which is herein incorporated by reference for all purposes.

BACKGROUND

An artificial reality system, such as a head-mounted display (HMD) or heads-up display (HUD) system, generally includes a display configured to present artificial images that depict objects in a virtual environment. The display may display virtual objects or combine real objects with virtual objects, as in virtual reality (VR), augmented reality (AR), or mixed reality (MR) applications. For example, in an AR system, a user may view both displayed images of virtual objects (e.g., computer-generated images (CGIs)) and the surrounding environment by, for example, seeing through transparent display glasses or lenses (often referred to as optical see-through) or viewing displayed images of the surrounding environment captured by a camera (often referred to as video see-through).

The user experience of using an artificial reality system may depend on several optical characteristics of the artificial reality system, such as the field of view (FOV), image quality (e.g., resolution), size of the eye box (to accommodate for eye and head movement), brightness of the displayed image, and the like. In general, the FOV and the eye box should be as large as possible, the resolution (e.g., the total number of pixels or angular resolution) should be as high as possible, and the brightness of the displayed image should be high enough (especially for optical see-through AR systems). For example, the eye box should allow for pupil movement caused by environmental use of the system (e.g., rotation of the eye and shift of the AR system), and allow for comfortable viewing of a large FOV with a desirable resolution. HMDs that provide only a small eye box may substantially impair the user experience, because the CGI images can be impaired, or even disappear from the user's vision, with a slight bump of the HMD or eye motions. However, increasing the eye box of the system may lead to a larger, heavier, more expensive, and less energy-effective system.

SUMMARY

The present disclosure generally relates to increasing the effective size of an eye box of a near-eye display device. In certain embodiments, the location of an eye box of an optical system in an artificial reality system may be dynamically adjustable based on the location of the user's eye, which may be determined by tracking the location and/or shape of the pupil of the user's eye. In one example, the optical system may include a projector for projecting images of virtual objects and/or real objects, a combiner for combining light from the projected images and light from the surrounding environment, and a steerable deflector or reflector (e.g., one or more Micro-Electro-Mechanical System (MEMS) mirrors) that may be steered based on the tracked location of the pupil of the user's eye to move the eye box of the optical system to the location of the pupil of the user's eye. In this way, the eye box of the optical system can be relatively small and can follow the movement of the user's eye. As a result, the overall size, cost, weight, and power consumption of the optical system can be significantly reduced, and thus the user experience can be improved.

According to some embodiments, a near-eye display system may include an image projector configured to form an image of a computer-generated image on an image plane. The near-eye display system may also include a deflector located at the image plane, where the deflector may be configurable, based on a location of a pupil of a user's eye, to deflect incident light from the image to a corresponding direction. The near-eye display system may further include a relay optical subsystem configured to relay the image deflected by the deflector to an exit pupil of the near-eye display system, where a location of the exit pupil is at least partially determined by the corresponding direction of the deflected light and at least partially overlaps with the location of the pupil of the user's eye.

In some embodiments of the near-eye display system, the relay optical subsystem may be configured to collimate light from each area of the image, and collimated light from different areas of the image may exit the exit pupil at different angles. In some embodiments, the image projector may include an image source configure to display the computer-generated image and an optical projector configured to form the image of the displayed computer-generated image on the image plane. In some embodiments, the image projector may include an optical image generator at the image plane.

In some embodiments of the near-eye display system, the deflector may include a micro-mirror, a prism, a polarization grating, or a diffractive optical element. In some embodiments, the near-eye display system may further include an actuator, where the actuator may be configured to, based on the location of the pupil of the user's eye, rotate the deflector or adjust a phase delay pattern of the deflector.

In some embodiments of the near-eye display system, the relay optical subsystem may include an optical combiner, where the optical combiner may be configured to direct light deflected by the deflector to the exit pupil of the near-eye display system and allow visible light from a field of view in a physical environment to pass through. In some embodiments, the optical combiner may include a dichroic plate, a prism, a polarization beam combiner, a hologram, a diffractive optical element, or a meta-material combiner. In some embodiments, the meta-structure may include a meta-grating. In some embodiments, the diffraction efficiency of the meta-grating is greater than 20% within a field of view of 40° for visible light, and the meta-grating may include an aperture pattern configured to allow visible light incident from an angular range to pass through.

In some embodiments, the near-eye display system may further include an eye-tracking subsystem configured to measure the location of the pupil of the user's eye, and an actuator configured to rotate the deflector based on the measured location of the pupil of the user's eye such that the pupil of the user's eye may at least partially overlap with the exit pupil of the near-eye display system. In some embodiments, the near-eye display system may include an eye-tracking subsystem configured to measure the location of the pupil of the user's eye, and a controller configured to adjust a phase delay pattern of the deflector based on the measured location of the pupil of the user's eye such that the pupil of the user's eye at least partially overlaps with the exit pupil of the near-eye display system.

According to certain embodiments, an optical system may include an optical projector configured to form an image of an image source on an intermediate image plane. The optical system may also include a steerable deflector at the image plane for deflecting light from the image to target directions. The optical system may further include an optical combiner configured to combine the deflected light from the image and light from an environment of the optical system, and direct the combined light to a pupil of a user's eye.

In some embodiments, the optical system may also include a controller coupled to the steerable deflector, where the controller may be configured to steer the deflector based on a location of the pupil of the user's eye such that a resultant exit pupil of the optical system at least partially overlaps with the pupil of the user's eye. In some embodiments, the optical system may also include a collimation lens between the steerable deflector and the optical combiner, where the collimation lens may be configured to collimate light from each area of the image. In some embodiments, the steerable deflector may include a micro-electro-mechanical system (MEMS) mirror. In some embodiments, the optical combiner may include a dichroic plate, a prism, a polarization beam combiner, a hologram, a diffractive optical element, or a meta-grating.

In certain embodiments, a method of steering an eye box (or exit pupil) of a near-eye display device is disclosed. The method may include determining a location of a pupil of an eye of a user of the near-eye display device, forming an image of a computer-generated image (CGI) on an image plane, configuring a deflector at or near the image plane based on the determined location of the pupil of the eye of the user, deflecting light from the image of the CGI to a relay optic subsystem by the deflector, and relaying the image of the CGI to the location of the pupil of the eye of the user by the relay optic subsystem.

In some embodiments, the method may further include transmitting, by the relay optic subsystem, light from a field of view in a surrounding environment to the location of the pupil of the eye of the user. In some embodiments, configuring the deflector based on the determined location of the pupil of the eye of the user may include determining an rotation angle for the deflector based on the determine location of the pupil of the eye of the user such that a resultant exit pupil of the near-eye display device at least partially overlaps with the pupil of the eye of the user, and rotating the deflector based on the determined rotation angle.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

DETAILED DESCRIPTION

Figure 1:
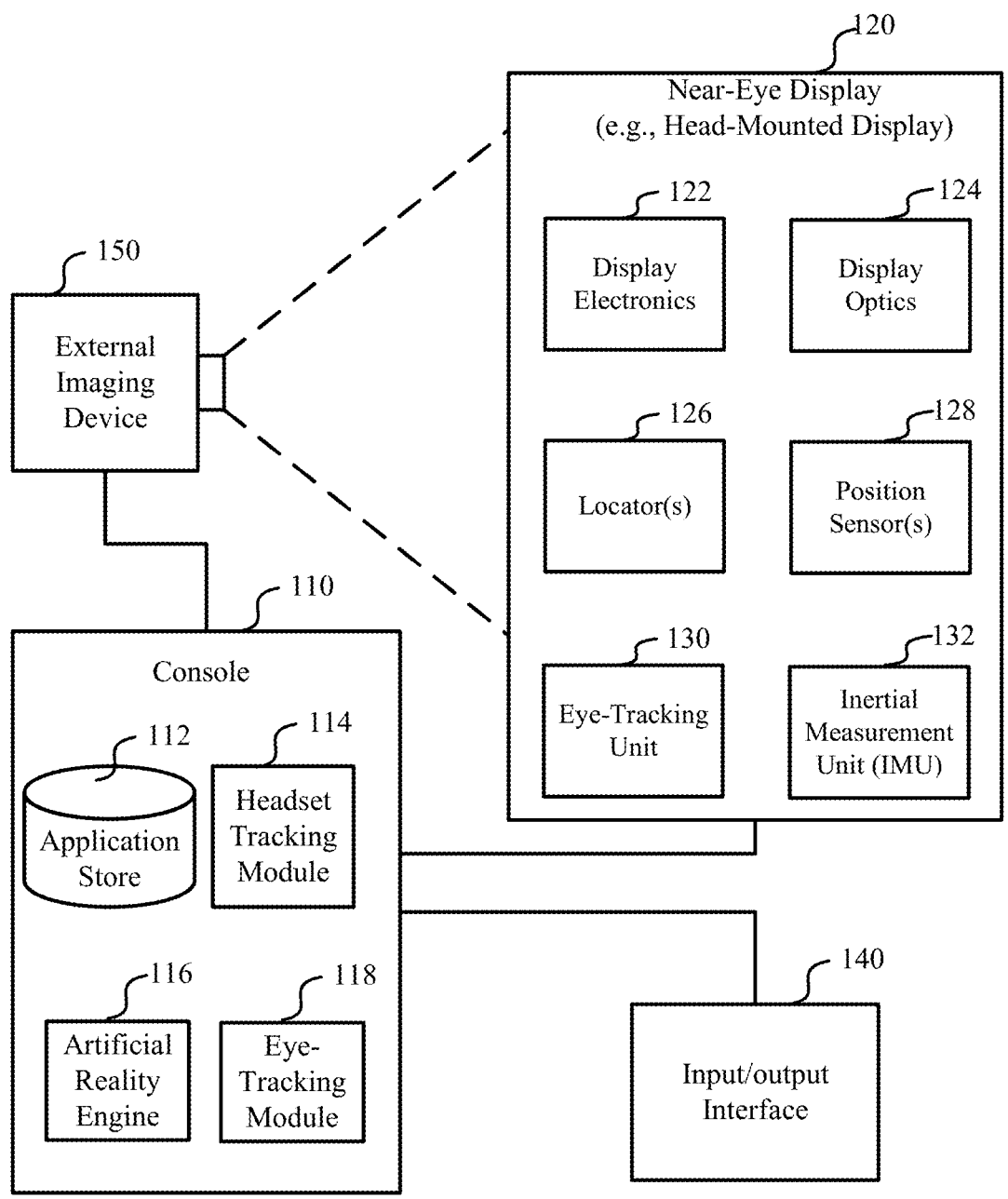
FIG. 1 is a block diagram of an example of an artificial reality system environment including a near-eye display according to certain embodiments.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof.

An artificial reality system, such as a virtual reality (VR), augmented reality (AR), or mixed reality (MR) system, may include a near-eye display (e.g., a headset or a pair of glasses) configured to present content to a user via an electronic or optic display (e.g., within about 10-20 mm in front of the user's eyes). In some cases, a VR, AR, or MR system may also include a console configured to generate content for presentation to the user and to provide the generated content to the near-eye display for presentation. For example, an AR system may project visual information generated by the console and blend it with visual information coming in naturally from the environment in a user's field of view without being distracting. The applications of existing artificial reality systems are limited due to, for example, the cost, size, weight, limited field of view, small eye box, or poor efficiency of conventional optical systems used to implement the artificial reality systems.

The area within which a user's eye may be positioned for viewing with an artificial reality system may be referred to as the eye box (or eye motion box) of the system. In some systems, the eye box of the system may be equivalent to the exit pupil of the system. In some systems, the eye box may represent a combination of the exit pupil size and the eye relief distance. To improve user experience with an artificial reality system, such as an AR system, a large eye box is usually desired. Some conventional systems adjust the location of the eye box with a mechanical adjustment system. Another technique is to oversize the eye box. However, a large eye box may result in a very large, heavy, expensive, and high power-consumption (in order to illuminate the large eye box) optical system, which may be impractical for consumer head-mounted display systems.

According to certain aspects of the present disclosure, the location of an eye box of an optical system in an artificial reality system may be dynamically adjustable based on the location of the user's eye, which may be determined by tracking the location and/or shape of the pupil of the user's eye. In one example, the optical system may include a projector for projecting images of virtual objects and/or real objects, a combiner for combining light from the projected images and light from the surrounding environment, and a beam steering deflector located between the projector and the combiner, such as at an image plane. The beam steering deflector (e.g., one or more Micro-Electro-Mechanical System (MEMS) mirrors) may be controlled based on the tracked location of the pupil of the user's eye to move the eye box of the optical system to the location of the pupil of the user's eye. In this way, the eye box of the optical system, and thus the whole optical system, can be relatively small, but the eye box can follow the movement of the user's eyes such that the effective size of the eye box can be large to improve the user experience.

FIG. 1 is a block diagram of an example of an artificial reality system environment 100 including a near-eye display 120, in accordance with certain embodiments. Artificial reality system environment 100 shown in FIG. 1 may include near-eye display 120, an external imaging device 150, and an input/output interface 140 that are each coupled to a console 110. While FIG. 1 shows example artificial reality system environment 100 including one near-eye display 120, one external imaging device 150, and one input/output interface 140, any number of these components may be included in artificial reality system environment 100, or any of the components may be omitted. For example, there may be multiple near-eye displays 120 monitored by one or more external imaging devices 150 in communication with console 110. In alternative configurations, different or additional components may be included in artificial reality system environment 100.

Near-eye display 120 may be a head-mounted display (HMD) that presents content to a user. Examples of content presented by near-eye display 120 include one or more of images, videos, audios, or some combination thereof. In some embodiments, audios may be presented via an external device (e.g., speakers and/or headphones) that receives audio information from near-eye display 120, console 110, or both, and presents audio data based on the audio information. Near-eye display 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display 120 may be implemented in any suitable form factor, including a pair of glasses. Some embodiments of near-eye display 120 are further described below with respect to FIGS. 2 and 3. Additionally, in various embodiments, the functionality described herein may be used in a headset that optically or electrically combines images of an environment external to near-eye display 120 and content received from console 110, or from any other console generating and providing content to a user. Therefore, near-eye display 120 may augment images of a physical, real-world environment external to near-eye display 120 with generated content (e.g., images, video, sound, etc.) to present an augmented reality to a user.

In various embodiments, near-eye display 120 may include one or more of display electronics 122, display optics 124, one or more locators 126, one or more position sensors 128, an eye-tracking unit 130, and an inertial measurement unit (IMU) 132. Near-eye display 120 may omit any of these elements or include additional elements in various embodiments. Additionally, in some embodiments, near-eye display 120 may include elements combining the function of various elements described in conjunction with FIG. 1.

Display electronics 122 may display images to the user according to data received from console 110. In various embodiments, display electronics 122 may include circuits for generating images of virtual or real objects, and/or circuits for driving some components of display optics 124, such as electrically steerable mirrors described in detail below. In some embodiments, display electronics 122 may include one or more display panels, such as a liquid crystal display (LCD), a liquid-crystal on silicon (LCOS) display, an organic light emitting diode (OLED) display, an inorganic light emitting diode (ILED) display, an active-matrix OLED display (AMOLED), a transparent OLED display (TOLED), digital micro-mirror device (DMD), or some other display. In one implementation of near-eye display 120, display electronics 122 may include a TOLED panel which may include sub-pixels to emit light of a predominant color such as red, green, blue, white, or yellow. In some implementations, display electronics 122 may display a 3D image through stereo effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers), or magnify image displayed by display electronics 122, correct optical errors associated with the image light, combine image light from display electronics 122 and the environment, and present the corrected and combined image light to a user of near-eye display 120. In various embodiments, display optics 124 may include one or more optical elements. Example optical elements may include a substrate, optical waveguides, an aperture, a Fresnel lens, a convex lens, a concave lens, a filter, a mirror, a diffractive optical element (DOE), or any other suitable optical element that may affect image light emitted from display electronics 122 and the environment. Display optics 124 may include a combination of different optical elements as well as mechanical couplings to maintain relative spacing and orientation of the optical elements in the combination. One or more optical elements in display optics 124 may have an optical coating, such as an anti-reflective coating, a reflective coating, a filtering coating, or a combination of different optical coatings.

Magnification of the displayed image by display optics 124 may allow display electronics 122 to be physically smaller, weigh less, and consume less power than larger displays. Additionally, magnification may increase a field of view of the displayed content. In some embodiments, display optics 124 may have an effective focal length larger than the spacing between display optics 124 and display electronics 122 to magnify image projected by display electronics 122. The amount of magnification of image by display optics 124 may be adjusted by adding or removing optical elements from display optics 124.

Display optics 124 may be designed to correct one or more types of optical errors, such as two-dimensional optical errors, three-dimensional optical errors, or a combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism. In some embodiments, content provided to display electronics 122 for display may be pre-distorted, and display optics 124 may correct the distortion when it receives image light from display electronics 122 generated based on the pre-distorted content.

Locators 126 may be objects located in specific positions on near-eye display 120 relative to one another and relative to a reference point on near-eye display 120. Console 110 may identify locators 126 in images captured by external imaging device 150 to determine the artificial reality headset's position, orientation, or both. A locator 126 may be a light emitting diode (LED), a corner cube reflector, a reflective marker, a type of light source that contrasts with an environment in which near-eye display 120 operates, or some combinations thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in any combination of portions of the electromagnetic spectrum.

External imaging device 150 may generate slow calibration data based on calibration parameters received from console 110. Slow calibration data may include one or more images showing observed positions of locators 126 that are detectable by external imaging device 150. External imaging device 150 may include one or more cameras, one or more video cameras, any other device capable of capturing images including one or more of locators 126, or some combinations thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display 120. Examples of position sensors 128 may include accelerometers, gyroscopes, magnetometers, other motion-detecting or error-correcting sensors, or some combinations thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or some combination thereof. Based on the one or more measurement signals from one or more position sensors 128, IMU 132 may generate fast calibration data indicating an estimated position of near-eye display 120 relative to an initial position of near-eye display 120. For example, IMU 132 may integrate measurement signals received from accelerometers over time to estimate a velocity vector and integrate the velocity vector over time to determine an estimated position of a reference point on near-eye display 120. Alternatively, IMU 132 may provide the sampled measurement signals to console 110, which may determine the fast calibration data. While the reference point may generally be defined as a point in space, in various embodiments, the reference point may also be defined as a point within near-eye display 120 (e.g., a center of IMU 132).

Eye-tracking unit 130 may include one or more imaging devices configured to capture eye tracking data, which an eye-tracking module 118 in console 110 may use to track the user's eye. Eye tracking may refer to determining an eye's position, including orientation and location of the eye, relative to near-eye display 120. For example, eye-tracking module 118 may output the eye's pitch and yaw based on images of the eye captured by eye-tracking unit 130. In various embodiments, eye-tracking unit 130 may measure electromagnetic energy reflected by the eye and communicate the measured electromagnetic energy to eye-tracking module 118, which may then determine the eye's position based on the measured electromagnetic energy. For example, eye-tracking unit 130 may measure electromagnetic waves such as visible light, infrared light, radio waves, microwaves, waves in any other part of the electromagnetic spectrum, or a combination thereof reflected by an eye of a user.

Eye-tracking unit 130 may include one or more eye-tracking systems. An eye-tracking system may include an imaging system to image one or more eyes and may optionally include a light emitter, which may generate light that is directed to an eye such that light reflected by the eye may be captured by the imaging system. For example, eye-tracking unit 130 may include a coherent light source (e.g., a laser diode) emitting light in the visible spectrum or infrared spectrum, and a camera capturing the light reflected by the user's eye. As another example, eye-tracking unit 130 may capture reflected radio waves emitted by a miniature radar unit. Eye-tracking unit 130 may use low-power light emitters that emit light at frequencies and intensities that would not injure the eye or cause physical discomfort. Eye-tracking unit 130 may be arranged to increase contrast in images of an eye captured by eye-tracking unit 130 while reducing the overall power consumed by eye-tracking unit 130 (e.g., reducing power consumed by a light emitter and an imaging system included in eye-tracking unit 130). For example, in some implementations, eye-tracking unit 130 may consume less than 100 milliwatts of power.

In some embodiments, eye-tracking unit 130 may include one light emitter and one camera to track each of the user's eyes. Eye-tracking unit 130 may also include different eye-tracking systems that operate together to provide improved eye tracking accuracy and responsiveness. For example, eye-tracking unit 130 may include a fast eye-tracking system with a fast response time and a slow eye-tracking system with a slower response time. The fast eye-tracking system may frequently measure an eye to capture data used by eye-tracking module 118 to determine the eye's position relative to a reference eye position. The slow eye-tracking system may independently measure the eye to capture data used by eye-tracking module 118 to determine the reference eye position without reference to a previously determined eye position. Data captured by the slow eye-tracking system may allow eye-tracking module 118 to determine the reference eye position with greater accuracy than the eye's position determined from data captured by the fast eye-tracking system. In various embodiments, the slow eye-tracking system may provide eye-tracking data to eye-tracking module 118 at a lower frequency than the fast eye-tracking system. For example, the slow eye-tracking system may operate less frequently or have a slower response time to conserve power.

Eye-tracking unit 130 may be configured to estimate the orientation of the user's eye. The orientation of the eye may correspond to the direction of the user's gaze within near-eye display 120. The orientation of the user's eye may be defined as the direction of the foveal axis, which is the axis between the fovea (an area on the retina of the eye with the highest concentration of photoreceptors) and the center of the eye's pupil. In general, when a user's eyes are fixed on a point, the foveal axes of the user's two eyes intersect that point. The pupillary axis of an eye may be defined as the axis that passes through the center of the pupil and is perpendicular to the corneal surface. In general, even though the pupillary axis and the foveal axis intersect at the center of the pupil, the pupillary axis may not directly align with the foveal axis. Because the foveal axis is defined according to the fovea, which is located in the back of the eye, the foveal axis may be difficult or impossible to measure directly in some eye tracking embodiments. Accordingly, in some embodiments, the orientation of the pupillary axis may be detected and the foveal axis may be estimated based on the detected pupillary axis.

In general, the movement of an eye corresponds not only to an angular rotation of the eye, but also to a translation of the eye, a change in the torsion of the eye, and/or a change in the shape of the eye. Eye-tracking unit 130 may also be configured to detect the translation of the eye, which may be a change in the position of the eye relative to the eye socket. In some embodiments, the translation of the eye may not be detected directly, but may be approximated based on a mapping from a detected angular orientation. Translation of the eye corresponding to a change in the eye's position relative to the eye-tracking unit may also be detected. Translation of this type may occur, for example, due to a shift in the position of near-eye display 120 on a user's head. Eye-tracking unit 130 may also detect the torsion of the eye and the rotation of the eye about the pupillary axis. Eye-tracking unit 130 may use the detected torsion of the eye to estimate the orientation of the foveal axis from the pupillary axis. Eye-tracking unit 130 may also track a change in the shape of the eye, which may be approximated as a skew or scaling linear transform or a twisting distortion (e.g., due to torsional deformation). Eye-tracking unit 130 may estimate the foveal axis based on some combinations of the angular orientation of the pupillary axis, the translation of the eye, the torsion of the eye, and the current shape of the eye.

In some embodiments, eye-tracking unit 130 may include multiple emitters or at least one emitter that can project a structured light pattern on all portions or a portion of the eye. The structured light pattern may be distorted due to the shape of the eye when viewed from an offset angle. Eye-tracking unit 130 may also include at least one camera that may detect the distortions (if any) of the structured light pattern projected onto the eye. The camera may be oriented on a different axis to the eye than the emitter. By detecting the deformation of the structured light pattern on the surface of the eye, eye-tracking unit 130 may determine the shape of the portion of the eye being illuminated by the structured light pattern. Therefore, the captured distorted light pattern may be indicative of the 3D shape of the illuminated portion of the eye. The orientation of the eye may thus be derived from the 3D shape of the illuminated portion of the eye. Eye-tracking unit 130 can also estimate the pupillary axis, the translation of the eye, the torsion of the eye, and the current shape of the eye based on the image of the distorted structured light pattern captured by the camera.

Near-eye display 120 may use the orientation of the eye to, e.g., determine an inter-pupillary distance (IPD) of the user, determine gaze direction, introduce depth cues (e.g., blur the image outside of the user's main line of sight), collect heuristics on the user interaction in the artificial reality media (e.g., time spent on any particular subject, object, or frame as a function of exposed stimuli), some other functions that are based in part on the orientation of at least one of the user's eyes, or some combination thereof. Because the orientation may be determined for both eyes of the user, eye-tracking unit 130 may be able to determine where the user is looking. For example, determining a direction of a user's gaze may include determining a point of convergence based on the determined orientations of the user's left and right eyes. A point of convergence may be the point where the two foveal axes of the user's eyes intersect (or the nearest point between the two axes). The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140.

Console 110 may provide content to near-eye display 120 for presentation to the user in accordance with information received from one or more of external imaging device 150, near-eye display 120, and input/output interface 140. In the example shown in FIG. 1, console 110 may include an application store 112, a headset tracking module 114, an artificial reality engine 116, and eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The computer-readable storage medium may be any memory, such as a hard disk drive, a removable memory, or a solid-state drive (e.g., flash memory or dynamic random access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking module 114 may track movements of near-eye display 120 using slow calibration information from external imaging device 150. For example, headset tracking module 114 may determine positions of a reference point of near-eye display 120 using observed locators from the slow calibration information and a model of near-eye display 120. Headset tracking module 114 may also determine positions of a reference point of near-eye display 120 using position information from the fast calibration information. Additionally, in some embodiments, headset tracking module 114 may use portions of the fast calibration information, the slow calibration information, or some combination thereof, to predict a future location of near-eye display 120. Headset tracking module 114 may provide the estimated or predicted future position of near-eye display 120 to artificial reality engine 116.

Headset tracking module 114 may calibrate the artificial reality system environment 100 using one or more calibration parameters, and may adjust one or more calibration parameters to reduce errors in determining the position of near-eye display 120. For example, headset tracking module 114 may adjust the focus of external imaging device 150 to obtain a more accurate position for observed locators on near-eye display 120. Moreover, calibration performed by headset tracking module 114 may also account for information received from IMU 132. Additionally, if tracking of near-eye display 120 is lost (e.g., external imaging device 150 loses line of sight of at least a threshold number of locators 126), headset tracking module 114 may re-calibrate some or all of the calibration parameters.

Artificial reality engine 116 may execute applications within artificial reality system environment 100 and receive position information of near-eye display 120, acceleration information of near-eye display 120, velocity information of near-eye display 120, predicted future positions of near-eye display 120, or some combination thereof from headset tracking module 114. Artificial reality engine 116 may also receive estimated eye position and orientation information from eye-tracking module 118. Based on the received information, artificial reality engine 116 may determine content to provide to near-eye display 120 for presentation to the user. For example, if the received information indicates that the user has looked to the left, artificial reality engine 116 may generate content for near-eye display 120 that mirrors the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display 120 or haptic feedback via input/output interface 140.

Eye-tracking module 118 may receive eye-tracking data from eye-tracking unit 130 and determine the position of the user's eye based on the eye tracking data. The position of the eye may include an eye's orientation, location, or both relative to near-eye display 120 or any element thereof. Because the eye's axes of rotation change as a function of the eye's location in its socket, determining the eye's location in its socket may allow eye-tracking module 118 to more accurately determine the eye's orientation.

In some embodiments, eye-tracking unit 130 may output eye-tracking data including images of the eye, and eye-tracking module 118 may determine the eye's position based on the images. For example, eye-tracking module 118 may store a mapping between images captured by eye-tracking unit 130 and eye positions to determine a reference eye position from an image captured by eye-tracking unit 130. Alternatively or additionally, eye-tracking module 118 may determine an updated eye position relative to a reference eye position by comparing an image from which the reference eye position is determined to an image from which the updated eye position is to be determined. Eye-tracking module 118 may determine eye position using measurements from different imaging devices or other sensors. For example, as described above, eye-tracking module 118 may use measurements from a slow eye-tracking system to determine a reference eye position, and then determine updated positions relative to the reference eye position from a fast eye-tracking system until a next reference eye position is determined based on measurements from the slow eye-tracking system.

Eye-tracking module 118 may also determine eye calibration parameters to improve precision and accuracy of eye tracking. Eye calibration parameters may include parameters that may change whenever a user dons or adjusts near-eye display 120. Example eye calibration parameters may include an estimated distance between a component of eye-tracking unit 130 and one or more parts of the eye, such as the eye's center, pupil, cornea boundary, or a point on the surface of the eye. Other example eye calibration parameters may be specific to a particular user and may include an estimated average eye radius, an average corneal radius, an average sclera radius, a map of features on the eye surface, and an estimated eye surface contour. In embodiments where light from the outside of near-eye display 120 may reach the eye (as in some augmented reality applications), the calibration parameters may include correction factors for intensity and color balance due to variations in light from the outside of near-eye display 120. Eye-tracking module 118 may use eye calibration parameters to determine whether the measurements captured by eye-tracking unit 130 would allow eye-tracking module 118 to determine an accurate eye position (also referred to herein as "valid measurements"). Invalid measurements, from which eye-tracking module 118 may not be able to determine an accurate eye position, may be caused by the user blinking, adjusting the headset, or removing the headset, and/or may be caused by near-eye display 120 experiencing greater than a threshold change in illumination due to external light.

Figure 2:
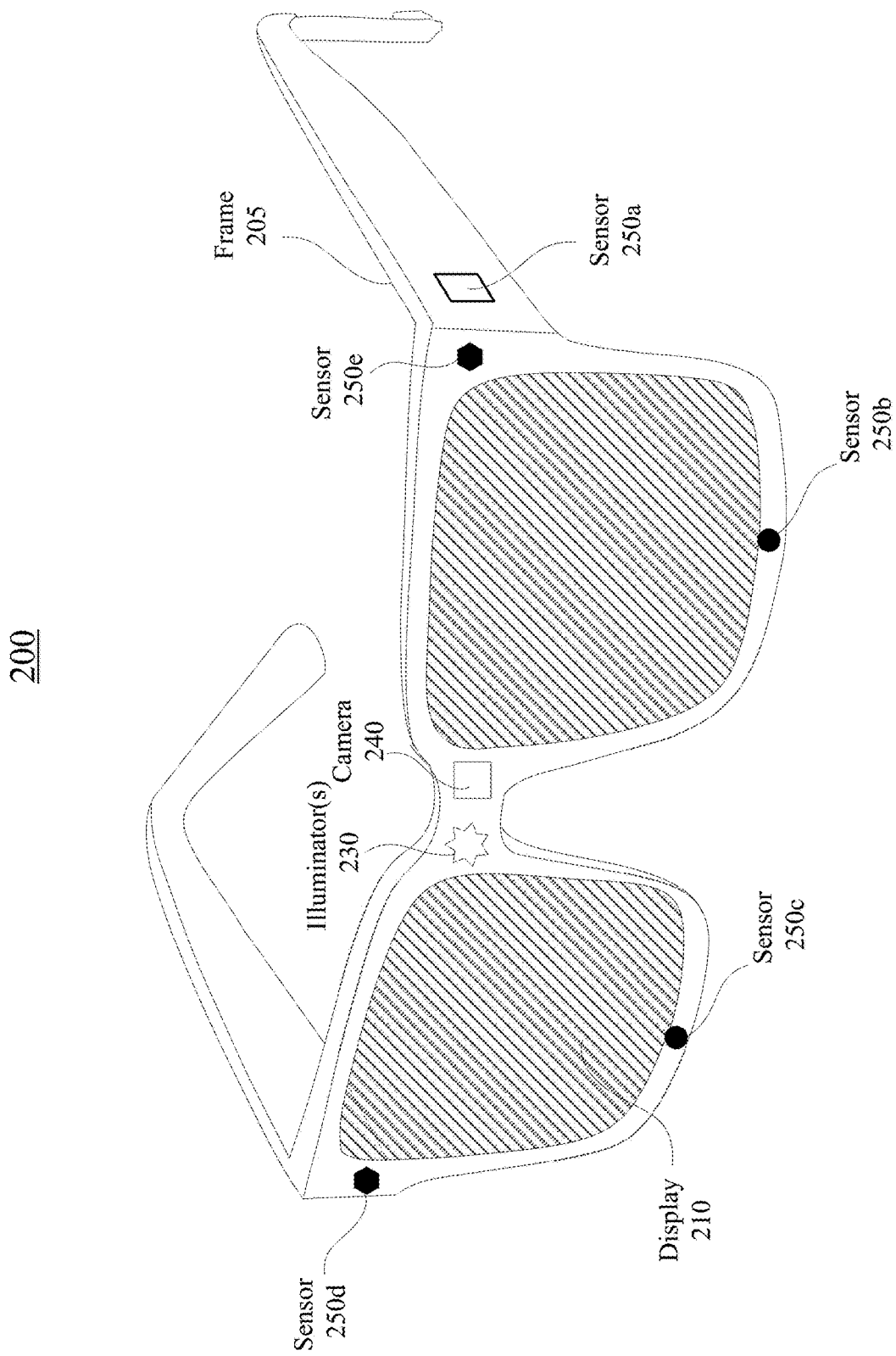
FIG. 2 is a perspective view of an example of a near-eye display including various sensors according to certain embodiments.

FIG. 2 is a perspective view of an example of a near-eye display 200 including various sensors. Near-eye display 200 may be a specific implementation of near-eye display 120 of FIG. 1, and may be configured to operate as a virtual reality display, an augmented reality display, and/or a mixed reality display. Near-eye display 200 may include a frame 205 and a display 210. Display 210 may be configured to present content to a user. In some embodiments, display 210 may include display electronics and/or display optics. For example, as described above with respect to near-eye display 120 of FIG. 1, display 210 may include an LCD display panel, an LED display panel, or an optical display panel (e.g., a waveguide display assembly).

Near-eye display 200 may further include various sensors 250a, 250b, 250c, 250d, and 250e on or inside frame 205. In some embodiments, sensors 250a-250e may include one or more depth sensors, motion sensors, position sensors, inertial sensors, or ambient light sensors. In some embodiments, sensors 250a-250e may include one or more image sensors configured to generate image data representing different fields of views in different directions. In some embodiments, sensors 250a-250e may be used as input devices to control or influence the displayed content of near-eye display 200, and/or to provide an interactive VR/AR/MR experience to a user of near-eye display 200. In some embodiments, sensors 250a-250e may also be used for stereoscopic imaging.

In some embodiments, near-eye display 200 may further include one or more illuminators 230 to project light into the physical environment. The projected light may be associated with different frequency bands (e.g., visible light, infra-red light, ultra-violet light, etc.), and may serve various purposes. For example, illuminator(s) 230 may project light in a dark environment (or in an environment with low intensity of infra-red light, ultra-violet light, etc.) to assist sensors 250a-250e in capturing images of different objects within the dark environment. In some embodiments, illuminator(s) 230 may be used to project a light pattern onto the objects within the environment. In some embodiments, illuminator(s) 230 may be used as locators, such as locators 126 described above with respect to FIG. 1.

In some embodiments, near-eye display 200 may also include a high-resolution camera 240. Camera 240 may capture images of the physical environment in the field of view. The captured images may be processed, for example, by an artificial reality engine (e.g., artificial reality engine 116 of FIG. 1) to add virtual objects to the captured images or modify physical objects in the captured images, and the processed images may be displayed to the user by display 210 for AR or MR applications.

As described above, some AR systems may take visual information generated by a light source, such as a mini projector placed above the eye or on the temple of the glasses, and display the information in front of the eye without blocking the view of the physical world. Such AR systems are often referred to as optical see-through (OST) displays, as they allow users to see through any optical components in the line of sight. Some AR systems may include video see-through (VST) displays. A VST display may capture images of the physical world through a video camera, combine the captured images with digital content, and project the combined content to the user on an opaque display. OST displays may allow user engagement with the physical world, maintain peripheral vision, and weigh less. VST displays may not need the optical see-through capability, and thus may have fewer challenges in the optic system.

Figure 3:
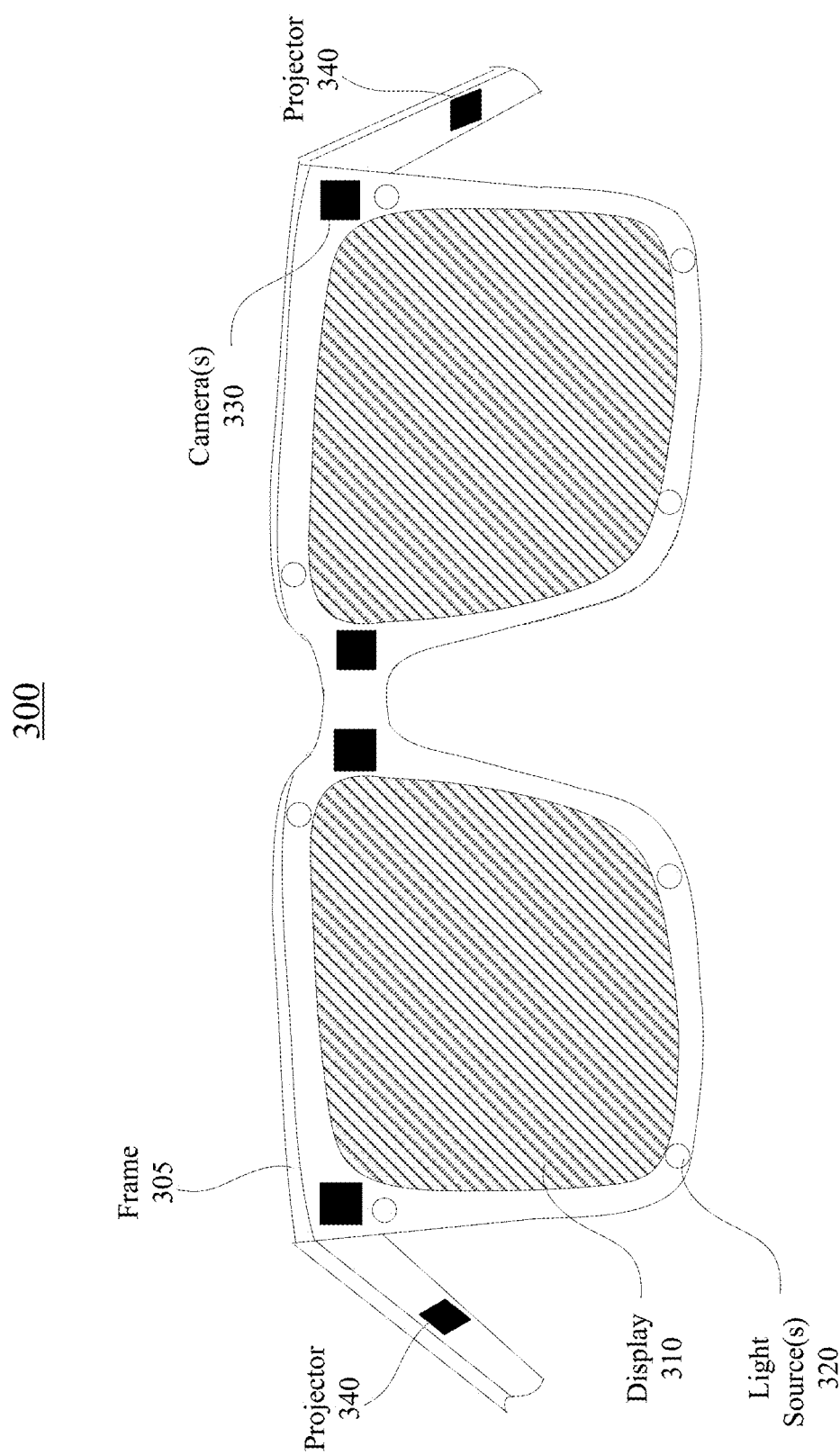
FIG. 3 is a perspective view of an example of a near-eye display including a projector according to certain embodiments.

FIG. 3 is a perspective view of an example of a near-eye display 300 including an image projector 340. FIG. 3 may be the perspective view of near-eye display 300 viewed from the side that faces the eyes of the user. As near-eye display 200, near-eye display 300 may include a frame 305 and a display 310. Frame 305 may be coupled to or embedded with one or more electrical or optical components. Display 310 may include display electronics and/or display optics, and may be configured to present content to a user. For example, as described above, display 310 may be a part of a video see-through system and may include an LCD display panel, an LED display panel, and/or an optical display panel (e.g., a waveguide display assembly). In some embodiments, near-eye display 300 may be an optical see-through artificial reality system, and display 310 may include an optical combiner that can combine image light from the display electronics and/or the display optics and light from the environment in front of display 310 of near-eye display 300. The optical combiner may include a free space optical combiner, such as a flat or curved combiner (e.g., a prism or bug eye reflective combiner), or a guided-wave optical combiner, such as a substrate-guided-wave combiner or an optical waveguide-based combiner.

In some embodiments, near-eye display 300 may include one or more image projectors 340 located on frame 305 (e.g., on the temples of frame 305). Projector 304 may generate and project image light toward display 310. In some embodiments, display 310 may include a flat or curved reflective surface for reflecting the projected image light to the eye of the user. In some embodiments, display 310 may include an optical coupler (e.g., a holographic, diffractive, or refractive coupler) configured to couple the projected image light into a substrate or waveguides of display 310. The projected light coupled into display 310 may propagate within the substrate or the waveguides of display 310, and maybe coupled out (i.e., extracted) at different locations on display 310 through one or more output couplers (i.e., extractors). Display 310 may allow light from the environment in front of display 310 to pass through and reach the eye of the user. More details of the optical system including the projector and combiner are described below.

Near-eye display 300 may include one or more light sources 320 and one or more cameras 330. Light source(s) 320 and camera(s) 330 may be coupled to or embedded in frame 305. Light source(s) 320 may emit light in a frequency range (e.g., NIR) towards the eye of the user. Near infrared (NIR) light may refer to light with a wavelength between about 750 nm to about 2500 nm. The emitted light may be reflected by the eyes of the user. The reflected light may then be received by camera(s) 330 to form images that may indicate certain characteristics of light source(s) 320 and the eyes of the user. Based on the images captured by camera(s) 330, an eye's position, including the orientation and location of the eye, may be determined.

In some embodiments as described below, display 310 may include one or more beam steering reflectors (e.g., mirrors or DOEs), the orientation of which can be adjusted based on the determined location of the eye of the user to move the eye box of near-eye display 300 to the location of the user's eye.

Figure 4:
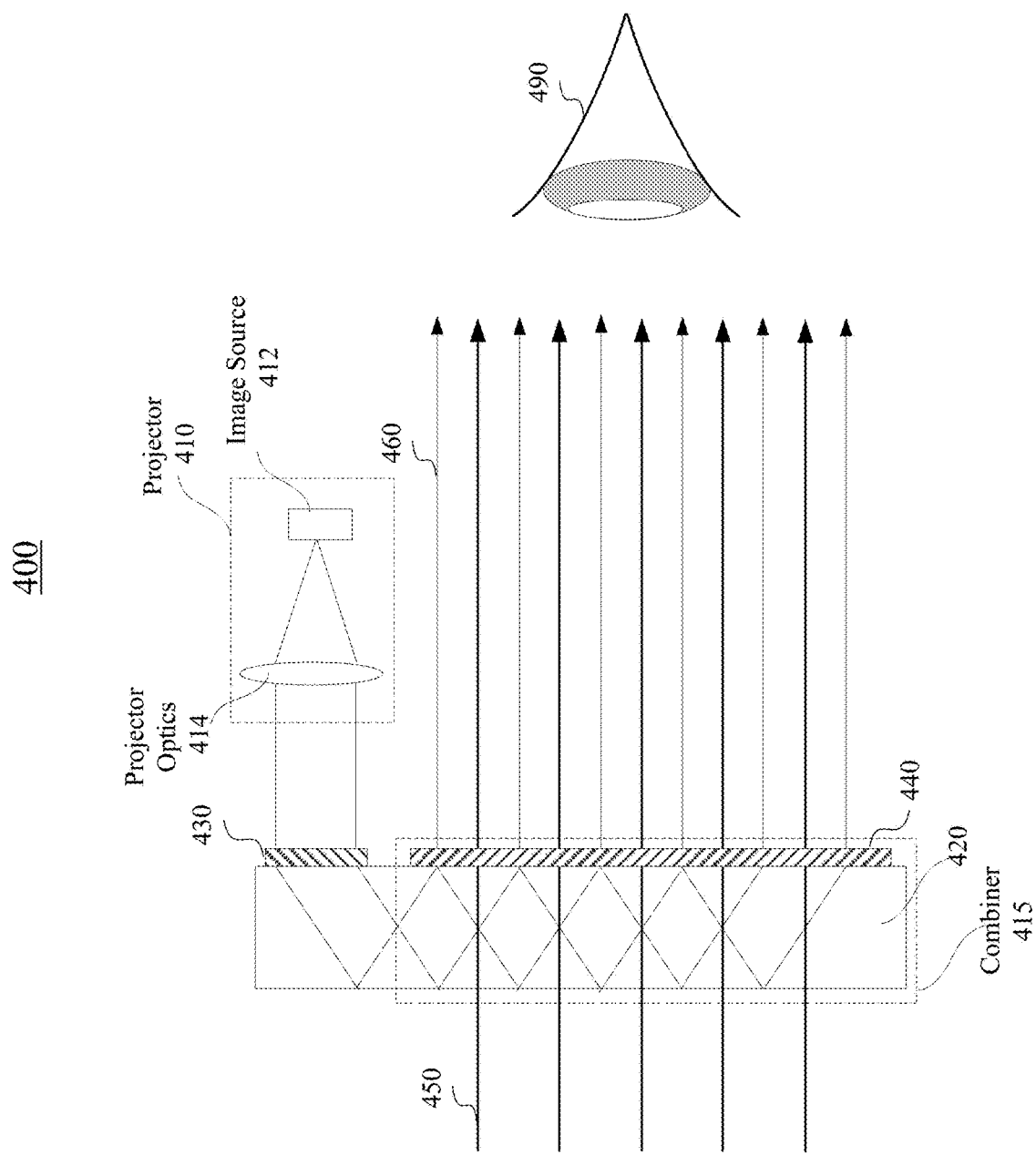
FIG. 4 illustrates an example of an optical see-through augmented reality system with a projector and a combiner according to certain embodiments.

FIG. 4 illustrates an example of an optical see-through augmented reality system 400 with a projector 410 and a combiner 415 according to certain embodiments. Projector 410 may include a light source or image source 412 and projector optics 414. In some embodiments, image source 412 may include a plurality of pixels that displays virtual objects, such as an LCD display panel or an LED display panel. In some embodiments, image source 412 may include a light source that generates coherent or partially coherent light. For example, image source 412 may include a laser diode, a vertical cavity surface emitting laser, and/or a light emitting diode. In some embodiments, image source 412 may include a plurality of light sources each emitting a monochromatic image light of a specific band of wavelength corresponding to a primary color (e.g., red, green, or blue). In some embodiments, image source 412 may include an optical pattern generator, such as a spatial light modulator. Projector optics 414 may include one or more optical components that can condition the light from image source 412, such as expanding, collimating, scanning, or projecting light from image source 412 to combiner 415. The one or more optical components may include one or more lenses, liquid lenses, mirrors, apertures, and/or gratings. In some embodiments, projector optics 414 may include a liquid lens (e.g., a liquid crystal lens) with a plurality of electrodes that allows scanning of the light from image source 412.

Combiner 415 may include an input coupler 430 for coupling light from projector 410 into a substrate 420 of combiner 415. Input coupler 430 may include a volume holographic grating, a DOE (e.g., a surface-relief grating), or a refractive coupler (e.g., a wedge or a prism). Input coupler 430 may have a coupling efficiency of greater than 30%, 50%, 75%, 90%, or higher for visible light. As used herein, visible light may refer to light with a wavelength between about 380 nm to about 750 nm. Light coupled into substrate 420 may propagate within substrate 420 through, for example, total internal reflection (TIR). Substrate 420 may be in the form of a lens of a pair of eyeglasses. Substrate 420 may have a flat or a curved surface, and may include one or more types of dielectric materials, such as glass, quartz, plastic, polymer, poly(methyl methacrylate) (PMMA), crystal, or ceramic. A thickness of the substrate may range from, for example, less than about 1 mm to about 10 mm or more. Substrate 420 may be transparent to visible light. A material may be "transparent" to a light beam if the light beam can pass through the material with a high transmission rate, such as larger than 60%, 75%, 80%, 90%, 95%, or higher, where a small portion of the light beam (e.g., less than 40%, 25%, 20%, 10%, 5%, or less) may be scattered, reflected, or absorbed by the material. The transmission rate (i.e., transmissivity) may be represented by either a photopically weighted or an unweighted average transmission rate over a range of wavelengths, or the lowest transmission rate over a range of wavelengths, such as the visible wavelength range.

Substrate 420 may include a plurality of output couplers 440 configured to extract at least a portion of the light guided by and propagating within substrate 420 from substrate 420 and direct extracted light 460 to an eye 490 of the user of optical see-through augmented reality system 400. As input coupler 430, output couplers 440 may include volume holographic grating couplers, prisms, or DOEs. Output couplers 440 may have different coupling (e.g., diffraction) efficiencies at different locations. Substrate 420 may also allow light 450 from environment in front of combiner 415 to pass through. Output couplers 440 may have low diffraction efficiencies for light 450 (e.g., due to the incident angle) and may allow light 450 to pass through with little loss. As a result, the user may be able to view combined images of the environment in front of combiner 415 and virtual objects projected by projector 410.

In addition to combining images of virtual objects and real objects, the optical system of a near-eye display may also relay the image source to create virtual images that appear to be away from the image source and further than just a few centimeters away from the eyes of the user. For example, the optical system may collimate the image source to create a virtual image that may appear to be far away and convert spatial information of the displayed virtual objects into angular information. The optical system may also magnify the image source to make the image appear larger than the actual size of the image source. In various implementations, the optical system of a near-eye display, such as an HMD, may be pupil-forming or non-pupil-forming.

Non-pupil-forming HMDs may not use intermediary optics to relay the displayed image, and thus the user's pupils may serve as the pupils of the HMD. Such non-pupil-forming displays may be variations of a magnifier (sometimes referred to as "simple eyepiece"), which may magnify a displayed image to form a virtual image at a greater distance from the eye. The non-pupil-forming display may use fewer optical elements. Pupil-forming HMDs may use optics similar to, for example, optics of a compound microscope or telescope, and may include an internal aperture and some forms of projection optics that magnify an intermediary image and relay it to the exit pupil. The more complex optical system of the pupil-forming HMDs may allow for a larger number of optical elements in the path from the image source to the exit-pupil, which may be used to correct optical aberrations and generate focal cues, and may provide design freedom for packaging the HMD. For example, a number of reflectors (e.g., mirrors) may be inserted in the optical path so that the optical system may be folded or wrapped around to fit in a compact HMD.

Figure 5:
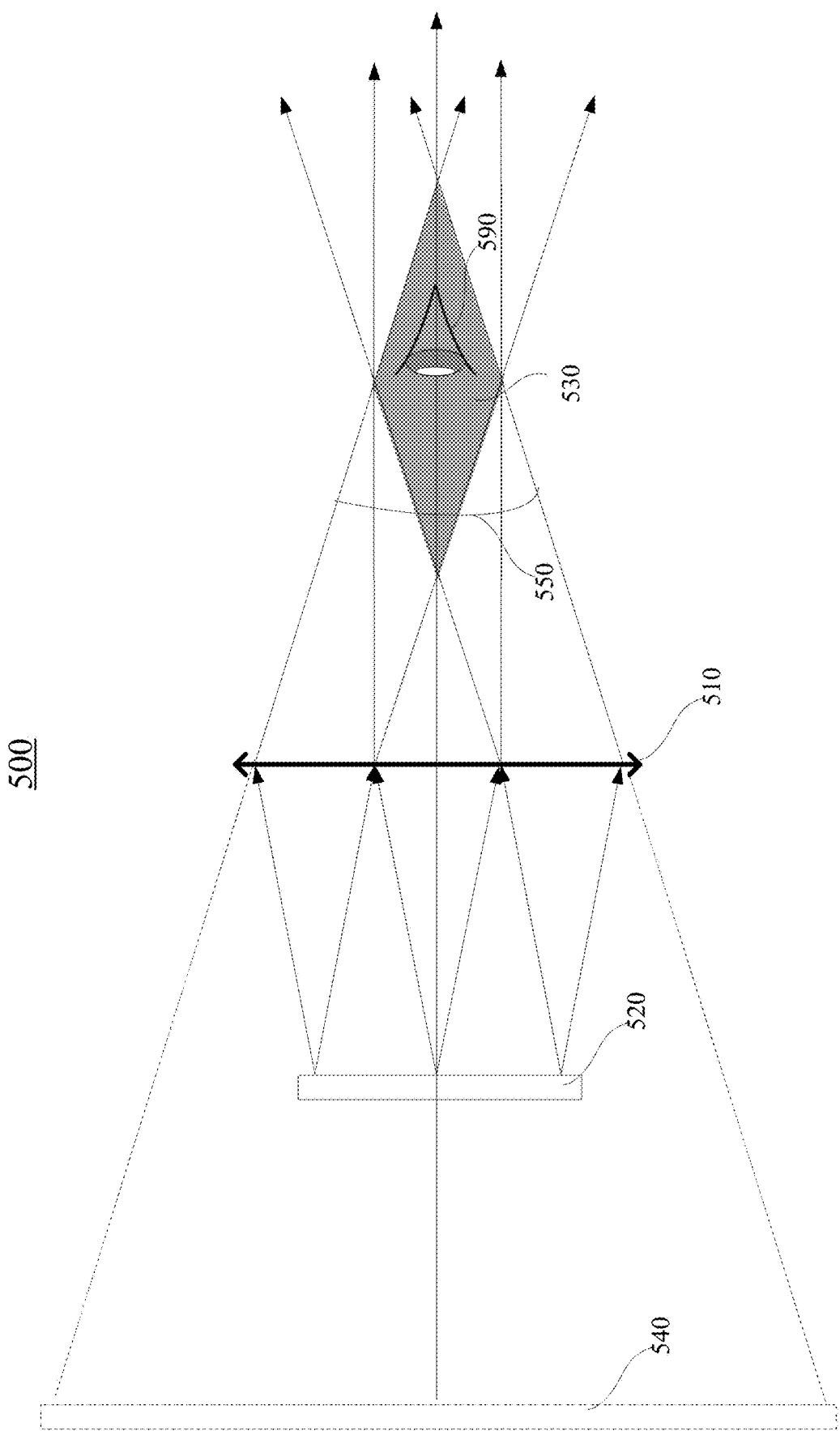
FIG. 5 illustrates an example of an optical system with a non-pupil forming configuration for a near-eye display device according to certain embodiments.

FIG. 5 illustrates an example of an optical system 500 with a non-pupil forming configuration for a near-eye display device according to certain embodiments. Optical system 500 may include projector optics 510 and an image source 520. FIG. 5 shows that image source 520 is in front of projector optics 510. In various embodiments, image source 520 may be located outside of the field of view of the user's eye 590. For example, one or more reflectors or directional couplers as shown in, for example, FIG. 4, may be used to reflect light from an image source to make the image source appear to be at the location of image source 520 shown in FIG. 5. Image source 520 may be similar to image source 412 described above. Light from an area (e.g., a pixel or a light emitting source) on image source 520 may be collimated and directed to user's eye 590 by projector optics 510. Thus, objects at different spatial locations on image source 520 may appear to be objects on an image plane 540 far away from the eye at different viewing angles. The light from different angles may then be focused by the eye onto different locations on the retina of the user's eye 590.

Figure 6:
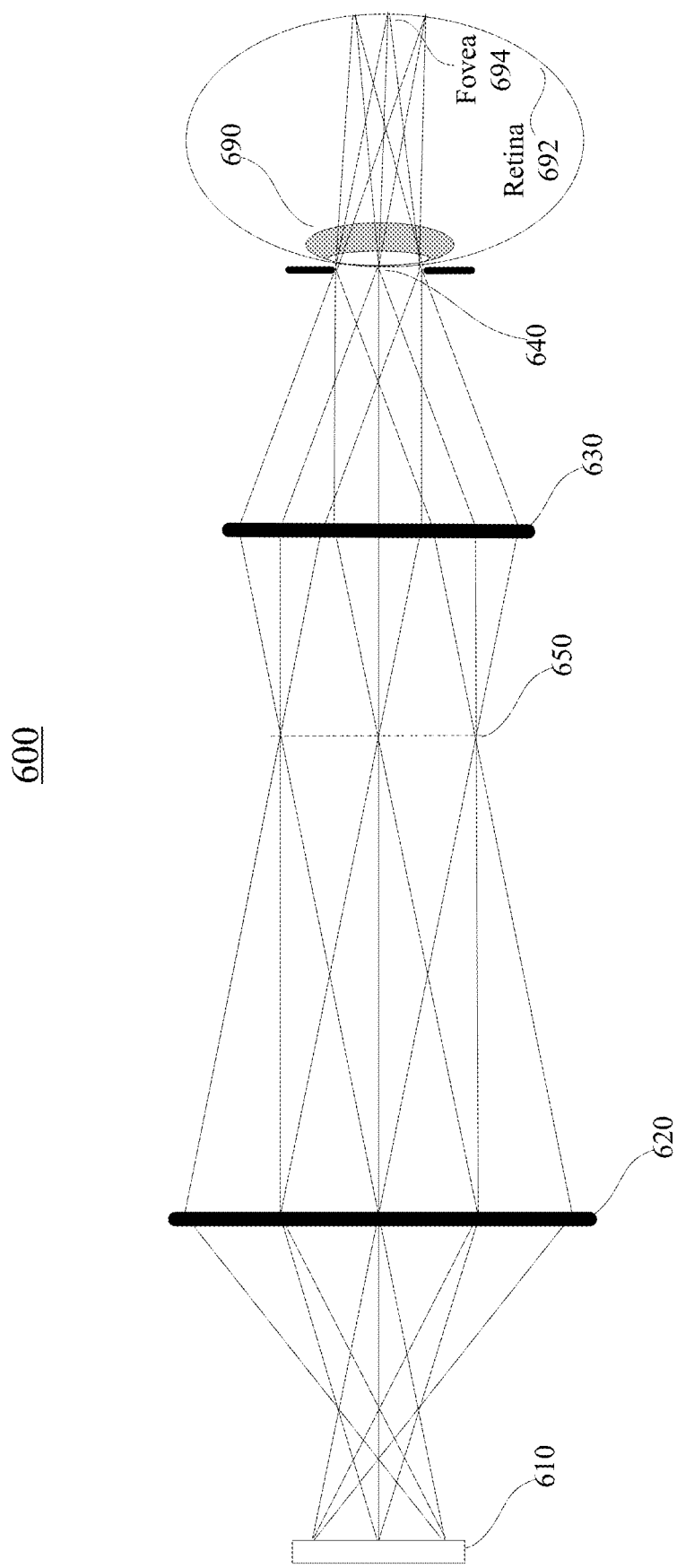
FIG. 6 illustrates an example of an optical system with a pupil forming configuration for a near-eye display device according to certain embodiments.

FIG. 6 illustrates an example of an optical system 600 with a pupil forming configuration for a near-eye display device according to certain embodiments. Optical system 600 may include an image source 610, a first relay lens 620, and a second relay lens 630. Even though image source 610, first relay lens 620, and second relay lens 630 are shown as in front of the user's eye 690, one or more of them may be physically located outside of the field of view of the user's eye 690 when, for example, one or more reflectors or directional couplers are used to change the propagation direction of the light. Image source 610 may be similar to image source 412 or 520 described above. First relay lens 620 may include one or more lenses, and may produce an intermediate image 650 of image source 610. Second relay lens 630 may include one or more lenses, and may relay intermediate image 650 to an exit pupil 640. As shown in FIG. 6, objects at different spatial locations on image source 610 may appear to be objects far away from the user's eye 690 at different viewing angles. The light from different angles may then be focused by the eye onto different locations on retina 692 of the user's eye 690. For example, at least some portion of the light may be focused on fovea 694 on retina 692.

The user experience of using an artificial reality system may depend on several characteristics of the optical system, including the field of view (FOV), image quality (e.g., angular resolution), size of the eye box (to accommodate for eye and head movements), and brightness of the light within the eye box. Field-of-view (FOV) describes the angular size of the image as seen by the user, usually measured in degrees as observed by one eye (for a monocular HMD) as shown by FOV 550 in FIG. 5 or both eyes (for either biocular or binocular HMDs). The human visual system may have a total binocular FOV of about 200° (horizontal) by 130° (vertical). To create a fully immersive visual environment, a large FOV is desirable because a large FOV (e.g., greater than 60°) may provide a sense of "being in" an image, rather than merely viewing the image. Smaller fields of view may also preclude some important visual information. For example, an HMD system with a small FOV may use a gesture interface, but the users may not see their hands in the small FOV to be sure that they are using the correct motions. On the other hand, wider fields of view may require larger displays or optical systems, which may influence the size, weight, and comfort of using the HMD.

Resolution may refer to the angular size of a displayed pixel or image element appearing to a user, or the ability for the user to view and correctly interpret an object as imaged by a pixel and/or other pixels. The resolution of an HMD is often specified as the number of pixels on the image source for a given FOV value, from which an angular resolution may be determined by dividing the FOV in one direction by the number of pixels in the same direction on the image source. For example, for a horizontal FOV of 40° and 1080 pixels in the horizontal direction on the image source, the corresponding angular resolution may be about 2.2 arcminutes, compared with the one-arc-minute resolution associated with Snellen 20/20 human visual acuity.

In some cases, the eye box may be defined as a two-dimensional box in front of the user's eye, from which the displayed image from the image source may be viewed. If the pupil of the user moves outside of the eye box, the displayed image may not be seen by the user. For example, in the non-pupil-forming configuration shown in FIG. 5, the viewing eye box within which there will be unvignetted viewing of the HMD image source is shown by area 530. When the pupil of user's eye 590 is outside of area 530, the displayed image may vignette or may be clipped, but may still be viewable. In the pupil-forming configuration shown in FIG. 6, the image may not be viewable outside exit pupil 640.

The fovea of a human eye, where the highest resolution may be achieved on the retina, may correspond to an FOV of about 2° to about 3°. This may require that the eye rotates in order to view off-axis objects with a high resolution. The rotation of the eye to view the off-axis objects may introduce a translation of the pupil because the eye rotates around a point that is about 10 mm behind the pupil. In addition, a user may not always be able to accurately position the pupil (e.g., with a radius of about 2.5 mm) of the user's eye at an ideal location in the eye box. Furthermore, the environment where the HMD is used may require the eye box to be larger to allow for movement of the user's eye and/or head relative the HMD, for example, when the HMD is used in a moving vehicle or designed to be used while moving on foot. The amount of movement in these situations may depend on how well the HMD is coupled to the user's head.

Thus, the optical system may need to provide a sufficiently large exit pupil or viewing eye box for viewing the full FOV with full resolution, in order to accommodate the movements of the user's pupil relative to the HMD. For example, in the pupil-forming configuration shown in FIG. 6, a minimum of 12 mm to 15 mm may be required for exit pupil 640. If the eye box is too small, minor misalignments between the eye and the HMD may result in at least partial loss of the image, and the user experience may be substantially impaired. In general, the lateral extent of the eye box is more critical than the vertical extent of the eye box. This may be in part due to the significant variances in eye separation distance between users, and the fact that misalignments to eyewear tend to more frequently occur in the lateral dimension and users tend to more frequently adjust their gaze left and right, and with greater amplitude, than up and down. Thus, techniques that can increase the lateral dimension of the eye box may substantially improve a user's experience with an HMD. On the other hand, the larger the eye box, the larger the optics and the heavier and bulkier the near-eye display device will be.

In order to view the displayed image against a bright background, the image source of an AR HMD may need to be bright enough, and the optical system may need to be efficient enough to provide a bright image to the user's eye such that the image may be visible with a background formed by ambient light. The optical system of an AR HMD may be designed to concentrate light in the eye box. When the exit pupil (i.e., the eye box) is large, an image source with high power may be needed in order to provide a bright image viewable within the large eye box. Thus, there may be trade-offs among the size of the eye box, cost, brightness, optical complexity, and size and weight of the optical system.

Figure 7:
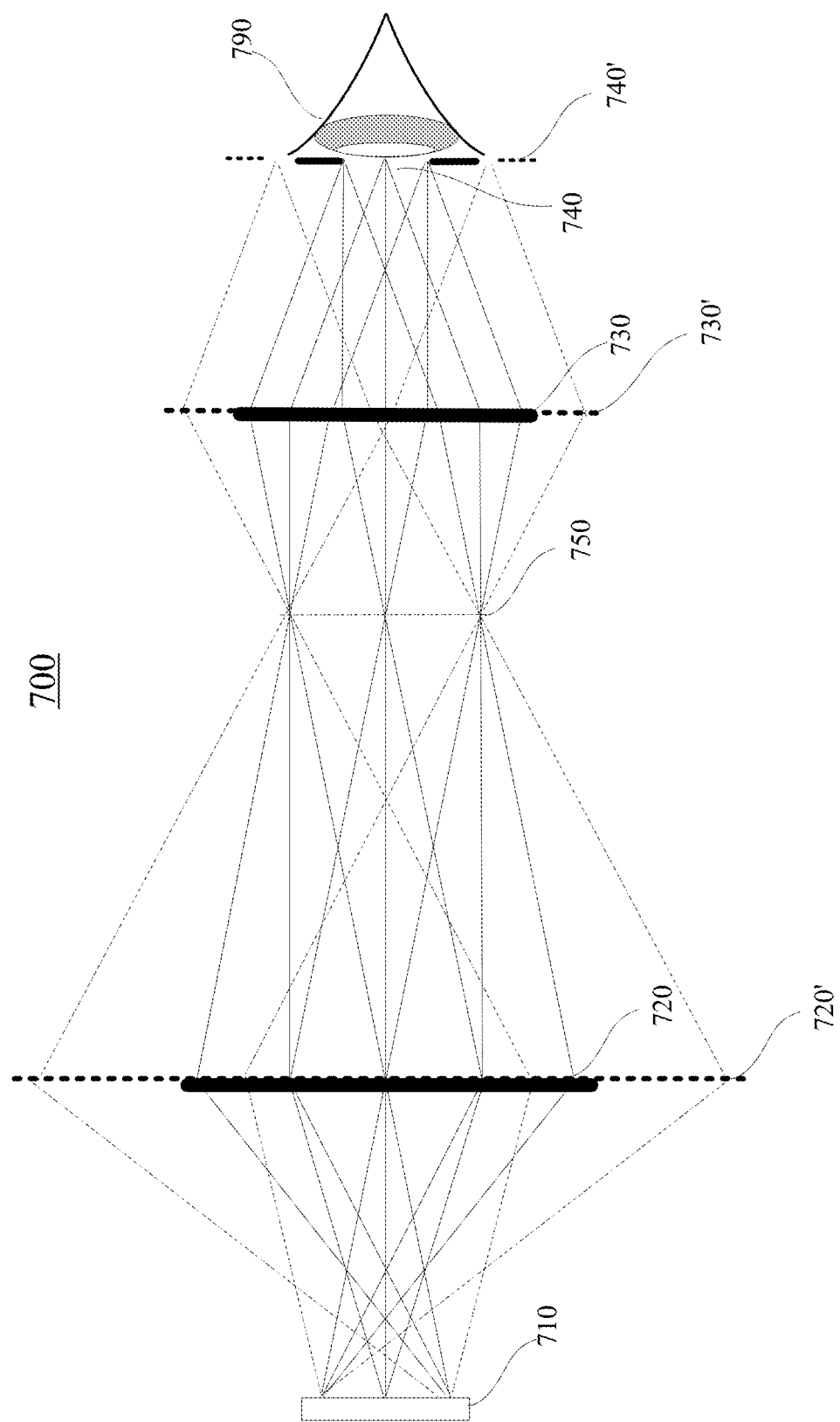
FIG. 7 is a diagram illustrating an example of increasing the size of an optical system of a near-eye display to increase an eye box of the near-eye display according to certain embodiments.

FIG. 7 is a diagram illustrating an example of increasing the size of an optical system 700 of a near-eye display in order to increase an eye box of the near-eye display according to certain embodiments. Optical system 700 may be similar to optical system 600 of FIG. 6, and may include an image source 710 (similar to image source 610), a first relay lens 720 (similar to first relay lens 620), and a second relay lens 730 (similar to second relay lens 630). First relay lens 720 may produce an intermediate image 750 of image source 710. Second relay lens 730 may relay intermediate image 750 to an exit pupil 740 for viewing by user's eye 790. As shown in FIG. 7, in order to increase exit pupil 740 to a larger exit pupil 740', first relay lens 720 and second relay lens 730 may need to be increased significantly as shown by the new first relay lens 720' and second relay lens 730'.

Figure 8:
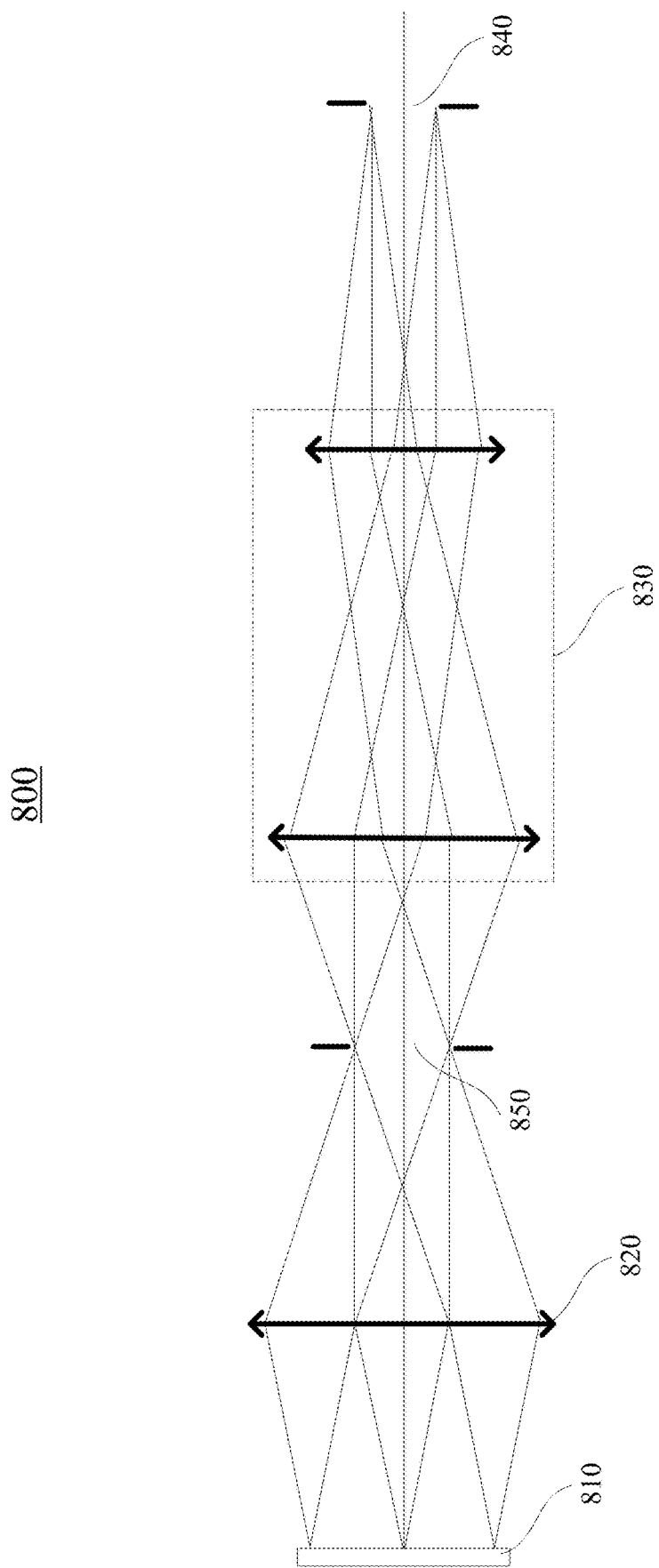
FIG. 8 is a diagram illustrating an example of an optical system with an intermediate pupil for a near-eye display device according to certain embodiments.

FIG. 8 is a diagram illustrating an example of an optical system 800 with an intermediate pupil 850 for a near-eye display device according to certain embodiments. Optical system 800 may include an image source 810, a first relay lens 820, and a second relay lens 830. Image source 810 may be similar to image source 412, 520, or 610. First relay lens 820 and second relay lens 830 may each include a single lens or a group of lenses. First relay lens 820 may form an intermediate pupil 850, which may then be relayed (i.e., imaged) by second relay lens 830 to form an exit pupil 840. As discussed above, one or more reflectors or directional couplers may be used to fold optical system 800.

Figure 9:
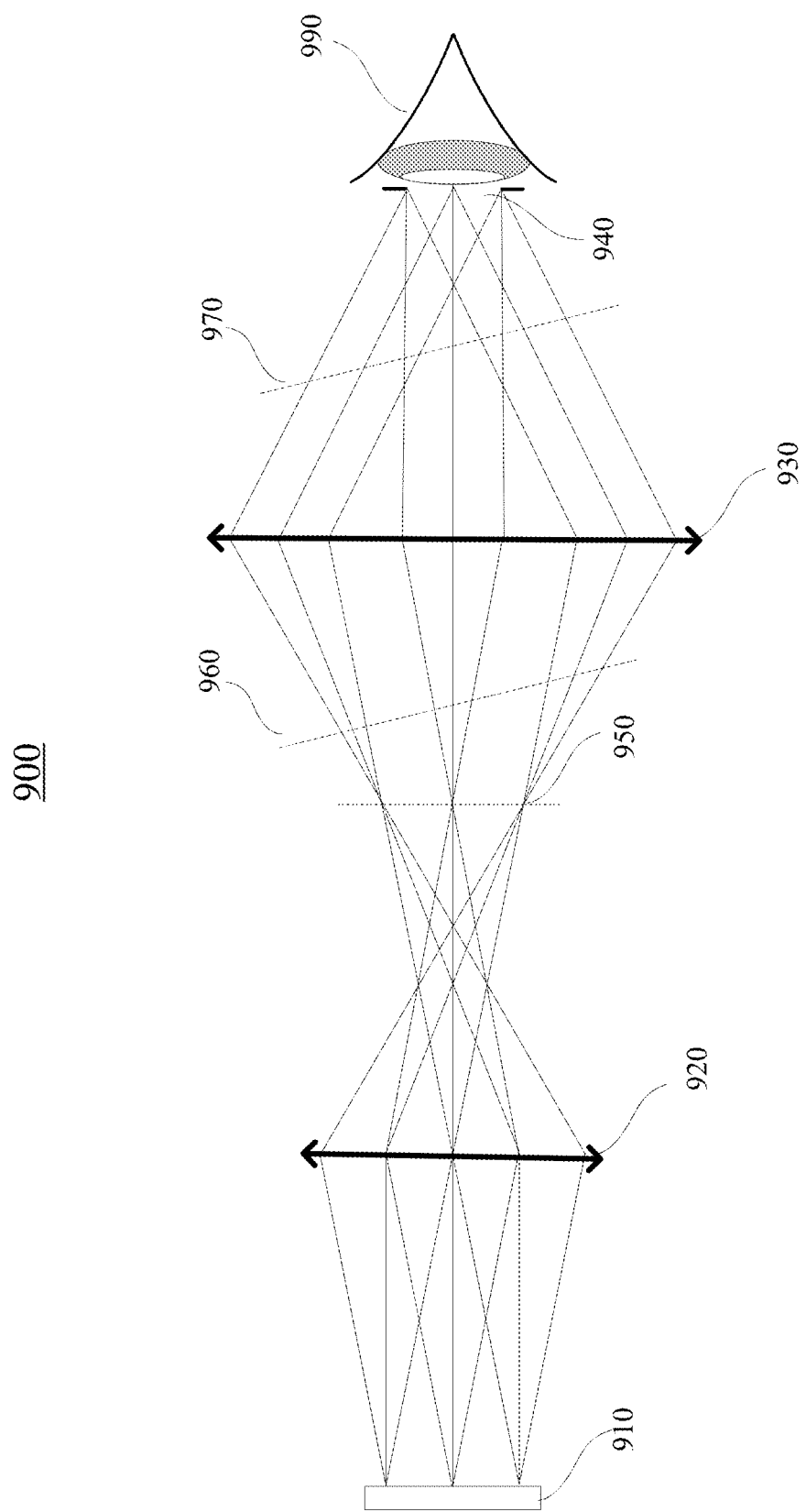
FIG. 9 illustrates an example of an optical system with a pupil-forming configuration and folding mirrors for a near-eye display device according to certain embodiments.

FIG. 9 illustrates an example of an optical system 900 with a pupil-forming configuration and folding mirrors for a near-eye display device according to certain embodiments. Optical system 900 may include an image source 910, a first relay lens 920, and a second relay lens 930. Image source 910 may be similar to image source 412, 520, or 610 described above. First relay lens 920 may include one or more lenses, and may produce an intermediate image 950 of image source 910. Second relay lens 930 may include one or more lenses, and may relay intermediate image 950 to an exit pupil 940. Optical system 900 may also include one or more reflectors (e.g., mirrors), refractors (e.g., prisms), or DOEs (e.g., gratings) that may change the propagation direction of the light from image source 910, such that image source 910, first relay lens 920, and second relay lens 930 may be physically located outside of the field of view of user's eye 990 and thus would not affect the view of ambient environment by the user's eye. For example, two mirrors 960 and 970 may be used to change the propagation direction of the light. At least one of mirrors 960 and 970 may also function as an optical combiner to combine light from image source 910 and light from the environment in the FOV of user's eye 990.

Figure 10:
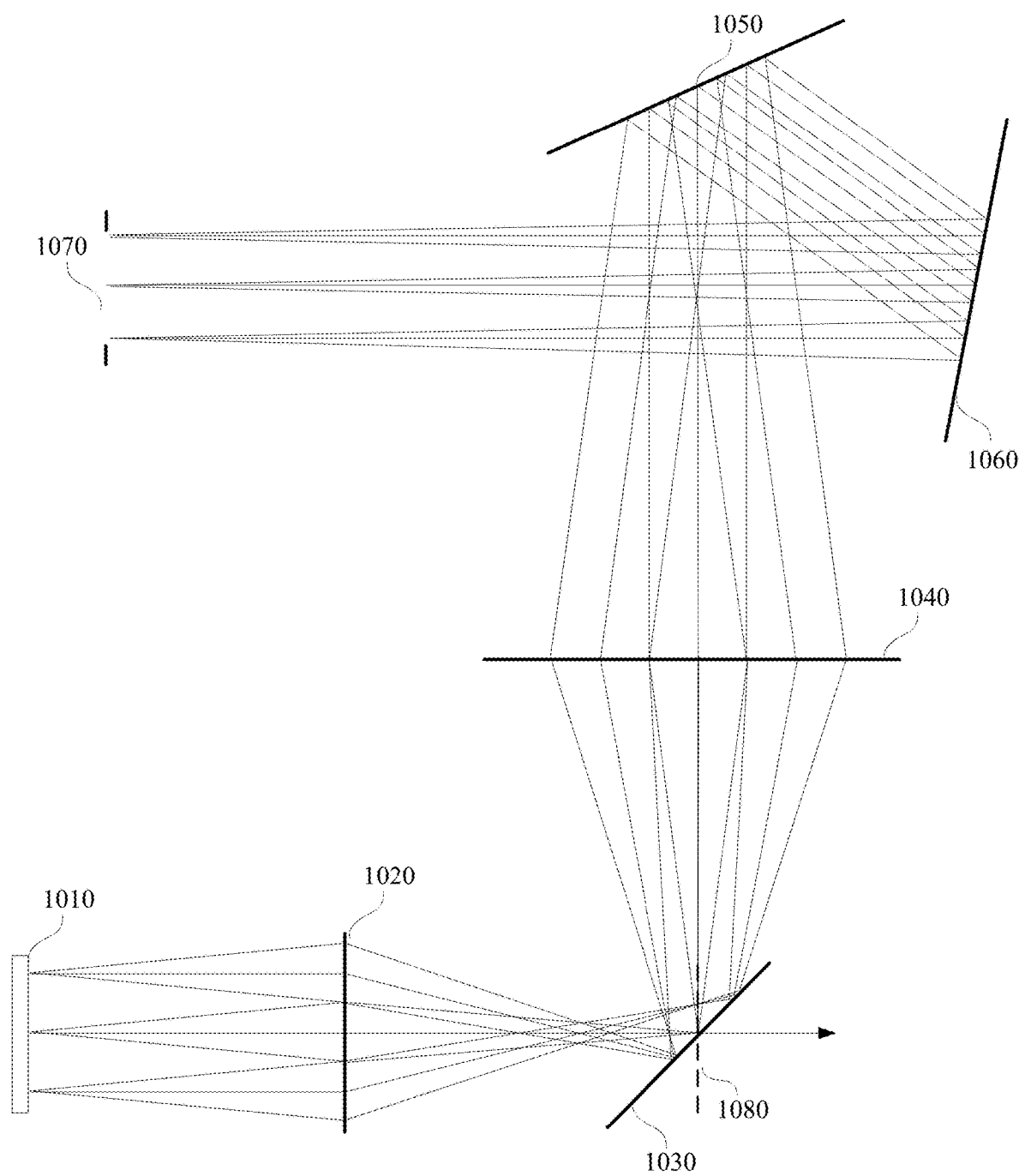
FIG. 10 illustrates an example of an optical system of an optical see-through augmented reality system according to certain embodiments.

FIG. 10 illustrates an example of an optical system 1000 of an optical see-through augmented reality system according to certain embodiments. Optical system 1000 may be an example of an implementation of optical system 900. In the example implementation shown in FIG. 10, optical system 1000 may include an image source 1010, a combiner 1060, one or more lenses 1020 and 1040, and one or more deflectors 1030 and 1050 (e.g., mirrors, prisms, polarization gratings, or DOEs). Image source 1010 may be similar to image source 910 described above. Image source 1010 and lens 1020 may form a projector that may project a displayed image from image source 1010 and form an intermediate image of image source 1010 on an intermediate image plane 1080.

Deflector 1030 may be located at or near intermediate image plane 1080 and may be tilted, such that the image of at least one point on image source 1010 is on deflector 1030. Deflector 1030 may reflect, for example, at least 50%, at least 70%, at least 90%, or substantially all of incident light in a desired wavelength range. The reflectivity may be represented by either a photopically weighted or an unweighted average reflectivity over a wavelength range, or the lowest reflectivity over a wavelength range, such as the visible wavelength range. Deflector 1030 may include a mirror having metallic coatings or dielectric thin films, or a diffractive optical element, such as a grating or Fresnel lens. Deflector 1030 may specularly reflect the incident light or otherwise deflect (e.g., diffract) the incident light toward lens 1040.

Lens 1040, deflector 1050, and combiner 1060 may relay the intermediate image to an exit pupil 1070 of optical system 1000. In some implementations, lens 1040 may substantially collimate light from image plane 1080, and each of deflector 1050 and combiner 1060 may specularly reflect or otherwise deflect the substantially collimated light to exit pupil 1070. In some implementations, deflector 1050 and/or combiner 1060 may have a non-zero optical power, and may be used independently or in combination with lens 1040 to substantially collimate light from image plane 1080. For example, deflector 1050 may have a curved surface. Combiner 1060 may have a curved surface or may include diffractive optical elements (e.g., diffractive lenses). Combiner 1060 may also combine light from deflector 1050 and light from the outside environment, and direct the combined light to exit pupil 1070. At exit pupil 1070, light from each area on image source 1010 may be converted into a substantially collimated beam propagating at a certain direction and incident on the user's eye at a certain angle.

According to certain aspects of the present disclosure, the location of exit pupil 1070 may be adjusted by changing the orientation of, for example, deflector 1030. In some implementations, deflector 1030 may include a light directing device, such as one or more micro-mirrors or gratings, driven by one or more scanning stages, piezoelectric actuators, Galvo-controllers, micro-motors, electromagnetic actuators, or acoustic actuators. In one example, deflector 1030 may include one or more microelectromechanical (MEMS) mirrors driven by one or more micro-motors. In some implementations, deflector 1030 may include an electro-optic material, the refractive index of which may be changed by changing the electrical field applied to the material. The changes in the refractive index may cause changes in the optical length (and phase) of deflector 1030, and thus may cause the light to change the propagation direction. The light directing device may react to the measured change of the location of the user's pupil as described above, and change the propagation direction of the light from the image source to form an exit pupil at the location of the user's pupil. In this way, each exit pupil may be designed to be small in order to reduce the size and weight of the optical system and reduce the power required to illuminate the exit pupil with sufficient light intensity. But the overall effective exit pupil or eye box of the optical system, which may be the aggregation of the exit pupils at different locations due to light steering by deflector 1030, may be large.

Figure 11:
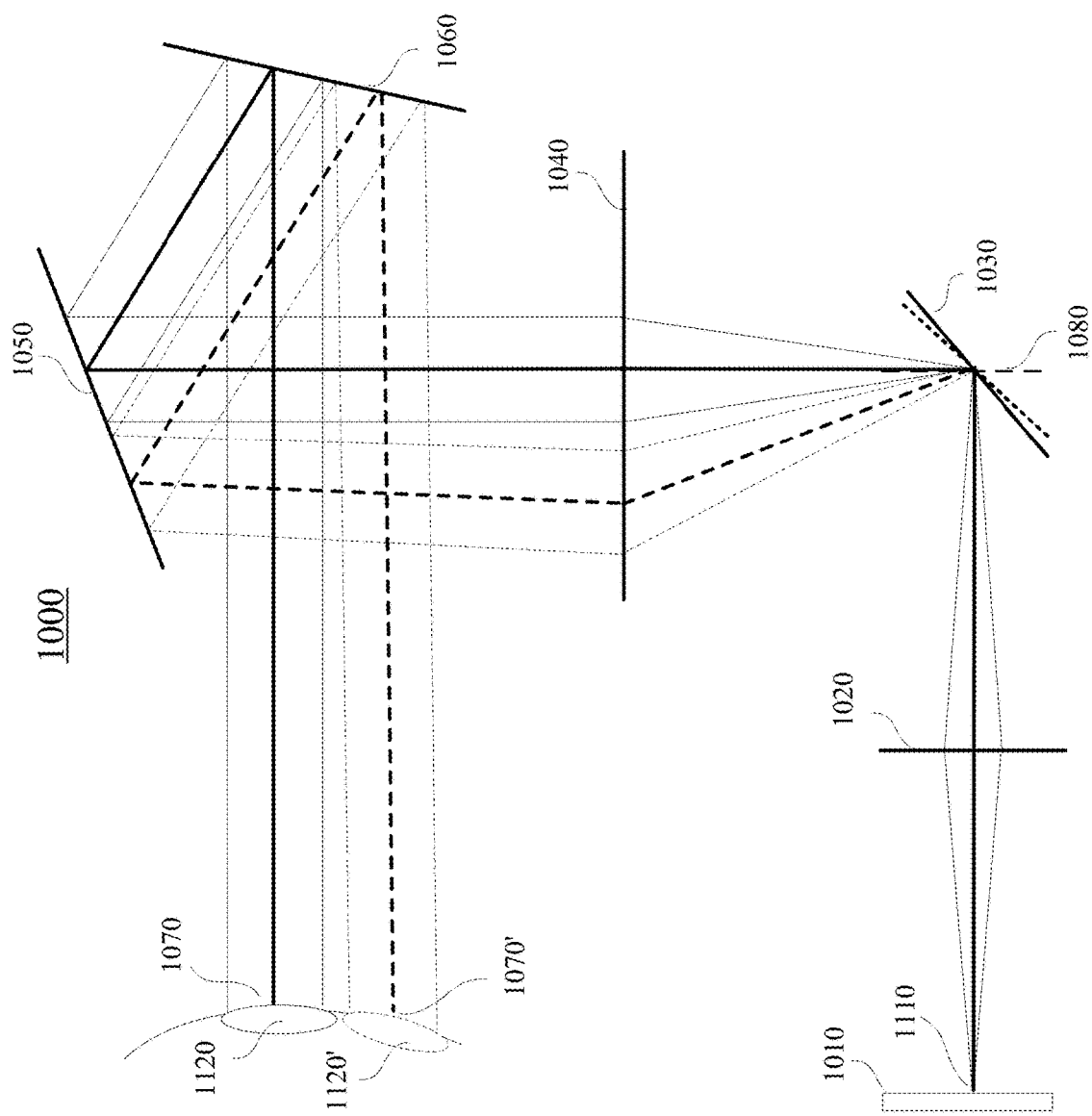
FIG. 11 illustrates an example of eye box steering using the optical system of FIG. 10 according to certain embodiments.

FIG. 11 illustrates an example of eye box steering using optical system 1000 according to certain embodiments. As shown by the solid lines in FIG. 11, lens 1020 may form an image of an area 1110 on image source 1010 at image plane 1080. When the pupil of the user's eye is at location 1120, deflector 1030 (e.g., a mirror) may be positioned in a first orientation shown by the solid line, and may reflect light from area 1110 on image source 1010 to lens 1040 as shown by the solid lines. Lens 1040, deflector 1050, and combiner 1060 may substantially collimate the light from image plane 1080 and direct the collimated light to exit pupil 1070 at location 1120. When the pupil of the user's eye moves to a different location 1120', deflector 1030 may be rotated by a controller to a second orientation shown by the dashed line, and may reflect light from area 1110 on image source 1010 to lens 1040 at a different angle as shown by the dashed lines. The rotation angle of deflector 1030 may be determined based on the location of the pupil of the user's eye such that a resultant exit pupil of optical system 1000 may at least partially overlap with the pupil of the user's eye. Lens 1040, deflector 1050, and combiner 1060 may substantially collimate the light from image plane 1080 and direct the collimated light to exit pupil 1070' at location 1120'. Thus, the location of the exit pupil can be moved by steering deflector 1030 to follow the movement of the user's eye.

As described above with respect to FIG. 9, in some implementations, optical system 900 may be folded differently from optical system 1000 shown in FIG. 10. For example, in some implementations, more or fewer deflectors may be used. In some implementations, more or fewer lenses may be used. In some implementations, a deflector may have a curved surface and may also act as a lens. A person skilled in the art would understand that there may be many different implementations.

Figure 12:
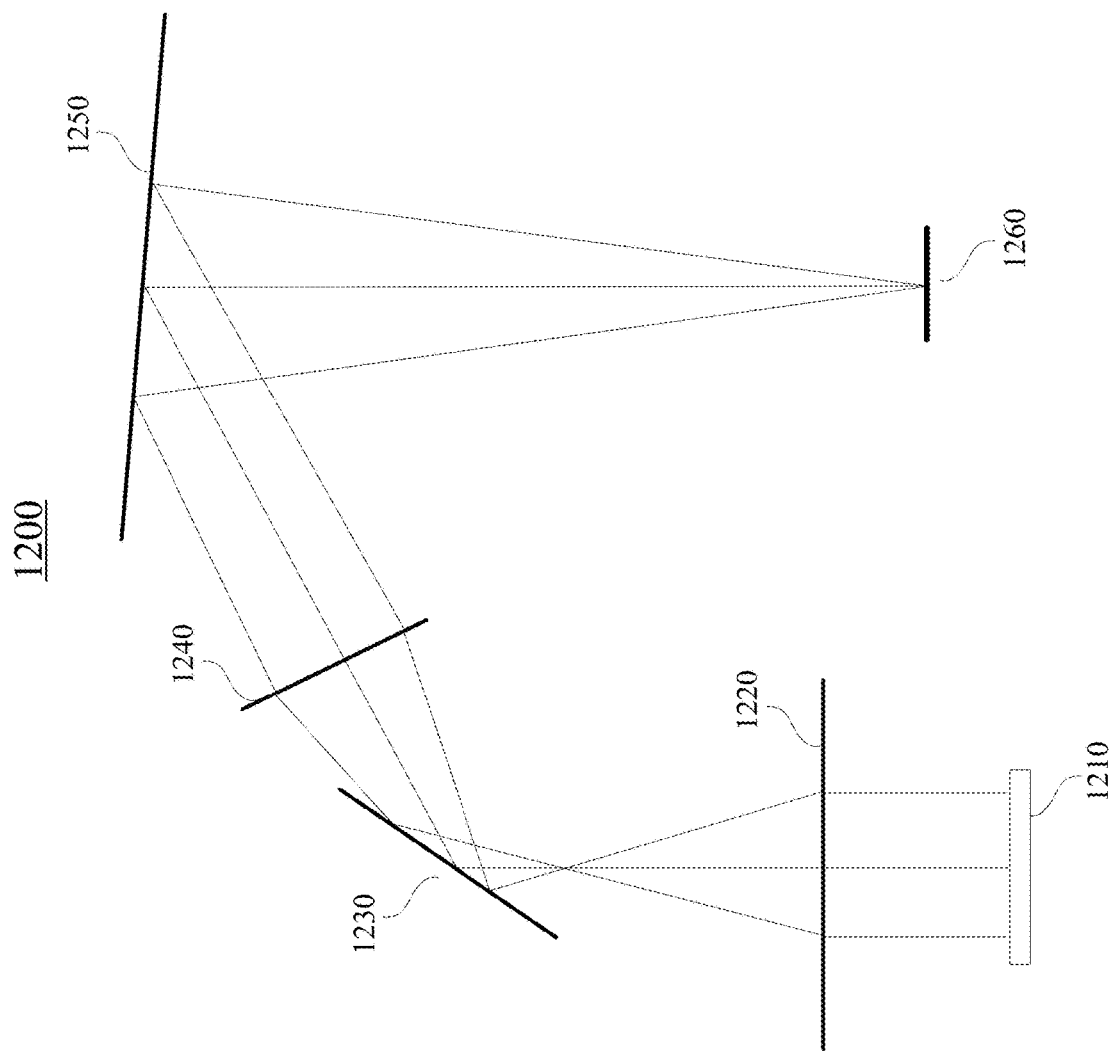
FIG. 12 illustrates an example of an optical system of an optical see-through augmented reality system according to certain embodiments.

For example, FIG. 12 illustrates an example of an optical system 1200 of an example optical see-through augmented reality system according to certain embodiments. Optical system 1200 may include an image source 1210, one or more lenses 1220 and 1240, and one or more deflectors 1230 and 1250 (e.g., mirrors or DOEs). Deflector 1250 may also function as a combiner. Image source 1210 may be similar to image source 1010 described above. Image source 1210 and lens 1220 may form a projector that may project a displayed image from image source 1210 to form an intermediate image of image source 1210 on an intermediate image plane. Deflector 1230 may be located at or near the intermediate image plane and may specularly reflect the incident light or otherwise deflect (e.g., diffract) the incident light toward lens 1240. Deflector 1230 may be electrically, acoustically, electromagnetically, or mechanically steerable. Lens 1240 and deflector 1250 may relay the intermediate image to an exit pupil 1260 of optical system 1200. In some implementations, deflector 1230 and/or deflector 1250 may include diffractive optical elements, and may deflect light at angles different from the specular reflection angle.

As described above, combiner 1060 or deflector 1250 may convey both image information of virtual objects (e.g., CGIs) and image information of physical objects in the field of view of a viewer toward the eyes of the viewer. The image information may be angularly encoded (e.g., by a collimation lens) for projecting virtual images into the eyes of the viewer. A combiner may combine two or more images together, from either the same side of the combiner (e.g., reflective/reflective or transmissive/transmissive combiner) or from two different sides of the combiner (e.g., reflective/transmissive combiner). In some implementations, the combiner may include a free space optical combiner, such as a flat or curved combiner (e.g., a prism, a bug eye reflective combiner, or a polarization beam combiner), or a guided-wave optical combiner, such as a substrate-guided-wave combiner or an optical waveguide-based combiner as described above. In some implementations, combiner 1060 or deflector 1250 may be a part of the lenses of eye glasses of an AR system.

In some implementations, a combiner (such as a tilted dichroic plate) may combine two light fields without adding any lensing to either light field. In some implementations, a combiner may include a lensing function in addition to the combining function. The combiner may be spherical, off-axis conic, aspheric, or freeform lensing for the projected light field coming from the image source. As discussed above, the lensing function may be used to displace the virtual image generated by the image source into a far field or at a specific distance from the combiner, and to position the virtual image in a certain field of view. The lensing function may also be used to correct at least some of the optical aberrations throughout the field of view being displayed. The lensing function may also be used to provide ophthalmic correction for individual users. In some implementations, a combiner may include an asymmetric surface with biaxial symmetry (i.e., an anamorphic surface). In some implementations, a combiner may include an asymmetric surface whose asymmetry goes beyond bi-axial asymmetry or toroidal shape (i.e., a freeform surface).

In some implementations, a combiner or deflector may include one or more diffractive optical elements, such as volume holographic gratings or surface-relief gratings. For example, in some implementations, a combiner or deflector may include a phase-gradient meta-structure that can be used to form low-profile lenses, holograms, beam steering devices, or other ultrathin optical devices. For example, the combiner may include a meta-material combiner, which may include a meta-grating, a geometric phase meta lens, or any meta material which can create proper phases using sub-wavelength elements. In one example, a meta-grating may be used to deflect light at a desired direction. A meta-grating may include a plurality of unit cells, where each unit cell may include a plurality engineered nanostructures (also referred to as meta-atoms) for modifying the wavefront of an incident beam. The operating characteristics of the meta-grating may be at least partially determined by the size, phase, and space of the meta-atoms.

Figure 13A:
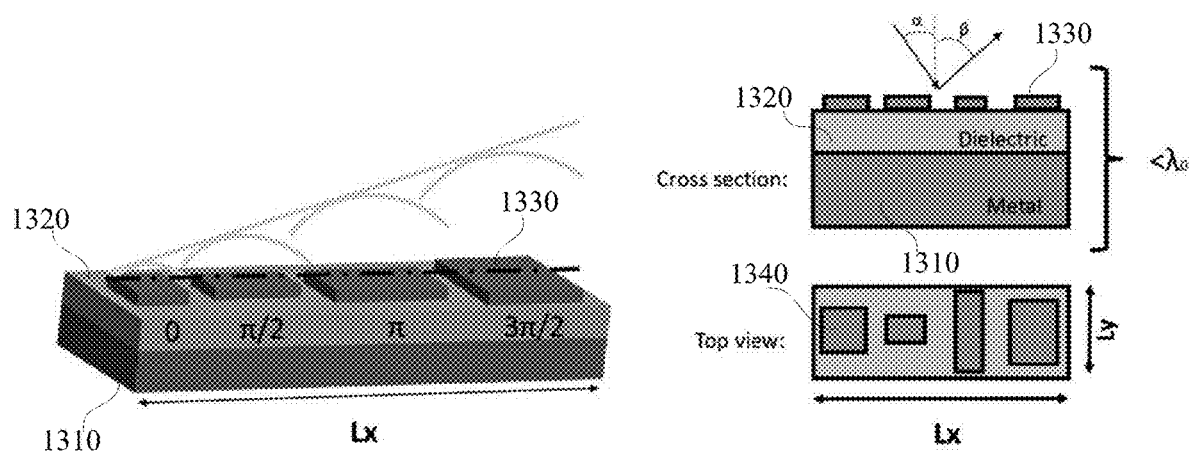
FIG. 13A illustrates an example of a unit cell of a meta-grating that can be used as a reflector and/or combiner according to certain embodiments.

FIG. 13A illustrates an example of a unit cell 1300 of a meta-grating that can be used as a deflector and/or combiner according to certain embodiments. Unit cell 1300 may include a base layer 1310, a dielectric layer 1320, and a meta-atom layer 1330, where dielectric layer 1320 may be supported by base layer 1310, and meta-atom layer 1330 may be supported by dielectric layer 1320. In some embodiments, base layer 1310 may be a metal layer, such as a silver layer. In some embodiments, dielectric layer 1320 may include, for example, a layer of magnesium fluoride. In some embodiments, base layer 1310 or dielectric layer 1320 may have a thickness of, for example, about 100 nm. In the example shown in FIG. 13A, unit cell 1300 may include four meta-atoms 1340, each meta-atom 1340 having a different phase delay of 0, $\pi/2$, $\pi$, or $3\pi/2$. The angle of diffraction may be determined by the following grating equation:

$$Lx(\sin \alpha + \sin \beta) = m\lambda,$$

where Lx is the dimension of the unit cell, $\alpha$ is the incident angle, $\beta$ is the diffraction angle of the mth diffraction order, and $\lambda$ is the wavelength of the incident light.

Figure 13B:
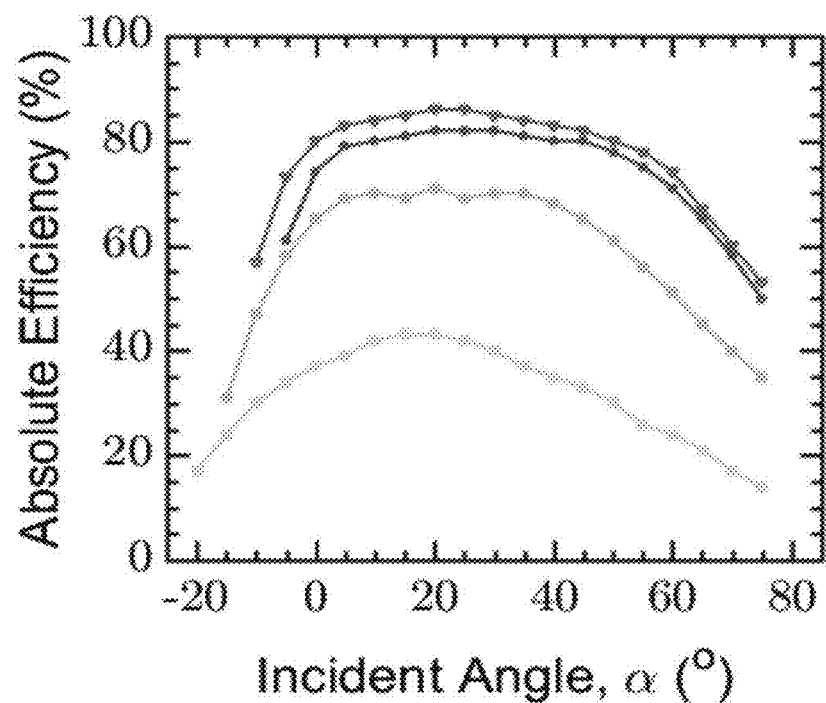
FIG. 13B illustrates the efficiency of the meta-grating shown in FIG. 13A as a function of incident angle at different wavelengths according to certain embodiments.

FIG. 13B illustrates the efficiency of the meta-grating shown in FIG. 13A as a function of incident angle at different visible light wavelengths according to certain embodiments. As shown in FIG. 13B, the meta-grating shown in FIG. 13A may have a diffraction efficiency greater than 50% for most visible light with a FOV of greater than 40°. It is noted that the unit cell of the meta-grating can be designed to have more phase delay levels and more meta-atoms with appropriate configuration to provide a desired efficiency over the visible light spectrum within a desired FOV.

In some implementations where a meta-grating is used as a combiner, the meta-grating device may be perforated with an aperture pattern that allows the light incident from an angular range to transmit through the meta-grating with a desired transmissivity to render the device substantially transparent to the viewer. In some implementations, the meta-grating may be configured to perform other wavefront modulation functions, such as lensing.

Figure 14:
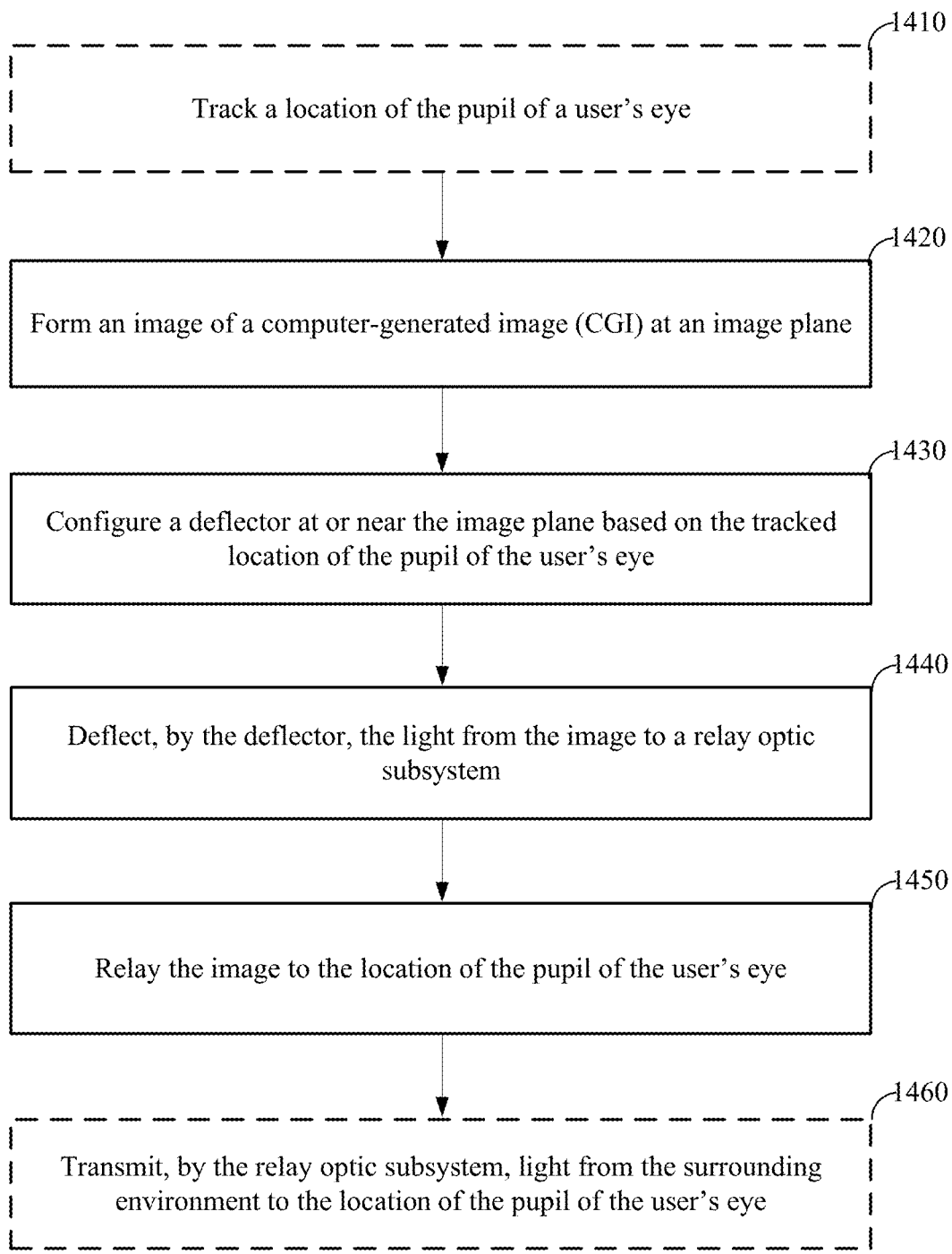
FIG. 14 is a flow chart illustrating an example of a method of eye box steering in a near-eye display according to certain embodiments.

FIG. 14 is a flow chart 1400 illustrating an example of a method of eye box steering in a near-eye display according to certain embodiments. The eye box steering method may be used to dynamically steer a relatively small exit pupil of the optical system of the near-eye display to the location of the user's pupil, which may have changed due to, for example, eye movements or relative movements between the near-eye display and the use's head. As such, the user may be able to view the full FOV of the near-eye display at full resolution in spite of the movements. The method may be performed by, for example, near-eye display 120, 200, or 300, optical see-through augmented reality system 400, or the optical see-through augmented reality system shown in FIGS. 9-12.

Optionally, at block 1410, an eye-tracking unit of the near-eye display and/or the corresponding eye-tracking module, such as eye-tracking unit 130 and/or eye-tracking module 118, may monitor the movement of the user's eyes and determine the translations or positions of the user's eyes as described above with respect to FIG. 1. The determined positions of the user's eyes may include the physical locations of the pupils of the user's eyes.

At block 1420, an image of a computer-generated image (CGI) may be formed at an image plane. In some implementations, the CGI may be projected by a projector to form the image at the image plane, where the image plane may be an intermediate image plane as described above with respect to, for example, FIGS. 6 and 9-12. In some implementations, the CGI may be generated at the image plane, for example, by an optical image generator (e.g., a spatial light modulator) or an LED array or panel.

At block 1430, a deflector at or near the image plane may be configured based on the determined location of the pupil of the user's eye. For example, the deflector may include a reflective or diffractive reflector, such as a mirror or a meta-grating driven by an actuator. The orientation of the reflector may be tuned based on the location of the pupil of the user's eye by the actuator as described above with respect to, for example, FIG. 11. In some embodiments, the phase delay pattern of the deflector may be electrically tuned to refractively or diffractively deflect light in different directions. An electrical field pattern determined based on the location of the pupil of the user's eye may be applied to the deflector to modulate the phase delay pattern of the deflector.

At block 1440, the deflector may deflect the light from the image to a relay optic subsystem. The direction of the deflected light may be different when the pupil of the user's eye is at a different location. In some implementations, the deflector may have an efficiency higher than, for example, 50%. In some implementations, the deflector may reflect incident light specularly. In some implementations, the deflector may deflect incident light at an angle different from the specular reflection angle.

At block 1450, the image of the CGI may be relayed to the location of the pupil of the user's eye by the relay optic subsystem. For example, the relay optic subsystem may form an exit pupil at the location of the pupil of the user's eye. In some embodiments, the relay optic subsystem may transform spatial information of the image into angular information. For example, the relay optic subsystem may substantially collimate light from each area on the image. As such, light from different areas on the image may enter the user's eye at different directions. The user's eye may then focus light from different directions onto different locations on the retina of the user's eye. The relay optic system may include one or more deflectors and/or one or more lenses as described above.

Optionally, at block 1460, the relay optic subsystem may also transmit light from the surrounding environment to the location of the pupil of the user's eye. For example, the relay optic subsystem may include an optical combiner that may allow visible light from the environment in the field of view of the user to pass through with little loss. In some implementations, the optical combiner may be one of the deflectors of the relay optic subsystem. In one specific embodiment, the optical combiner may include a meta-grating configured to diffract incident light from the image of the CGI to a desired direction toward the pupil of the user's eye. The meta-grating may also be perforated with an aperture pattern that allows visible light incident at a certain angular range (or FOV) from the environment to pass through the meta-grating with a desired transmissivity. In this way, the user may view both real objects in the FOV in the physical environment and computer-generated images of virtual objects for augmented reality applications.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 15:
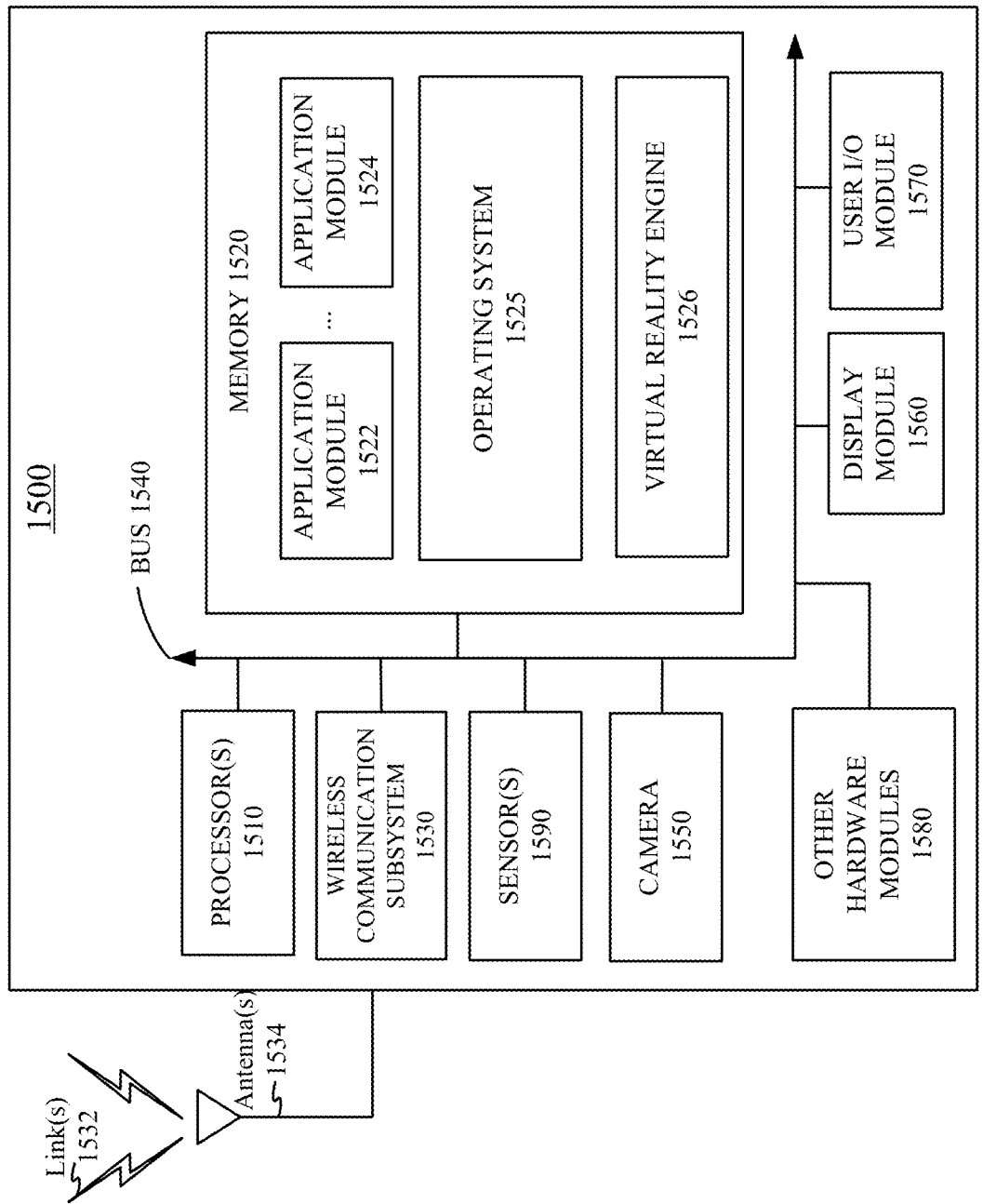
FIG. 15 is a block diagram of an example of an electronic system of an example near-eye display for implementing some of the examples disclosed herein.

FIG. 15 is a block diagram of an example electronic system 1500 of an example near-eye display (e.g., HMD device) for implementing some of the examples disclosed herein. Electronic system 1500 may be used as the electronic system of an HMD device or other near-eye displays described above. In this example, electronic system 1500 may include one or more processor(s) 1510 and a memory 1520. Processor(s) 1510 may be configured to execute instructions for performing operations at a number of components, and can be, for example, a general-purpose processor or microprocessor suitable for implementation within a portable electronic device. Processor(s) 1510 may be communicatively coupled with a plurality of components within electronic system 1500. To realize this communicative coupling, processor(s) 1510 may communicate with the other illustrated components across a bus 1540. Bus 1540 may be any subsystem adapted to transfer data within electronic system 1500. Bus 1540 may include a plurality of computer buses and additional circuitry to transfer data.

Memory 1520 may be coupled to processor(s) 1510. In some embodiments, memory 1520 may offer both short-term and long-term storage and may be divided into several units. Memory 1520 may be volatile, such as static random access memory (SRAM) and/or dynamic random access memory (DRAM) and/or non-volatile, such as read-only memory (ROM), flash memory, and the like. Furthermore, memory 1520 may include removable storage devices, such as secure digital (SD) cards. Memory 1520 may provide storage of computer-readable instructions, data structures, program modules, and other data for electronic system 1500. In some embodiments, memory 1520 may be distributed into different hardware modules. A set of instructions and/or code might be stored on memory 1520. The instructions might take the form of executable code that may be executable by electronic system 1500, and/or might take the form of source and/or installable code, which, upon compilation and/or installation on electronic system 1500 (e.g., using any of a variety of generally available compilers, installation programs, compression/decompression utilities, etc.), may take the form of executable code.

In some embodiments, memory 1520 may store a plurality of application modules 1522 through 1524, which may include any number of applications. Examples of applications may include gaming applications, conferencing applications, video playback applications, or other suitable applications. The applications may include a depth sensing function or eye tracking function. Application modules 1522-1524 may include particular instructions to be executed by processor(s) 1510. In some embodiments, certain applications or parts of application modules 1522-1524 may be executable by other hardware modules 1580. In certain embodiments, memory 1520 may additionally include secure memory, which may include additional security controls to prevent copying or other unauthorized access to secure information.

In some embodiments, memory 1520 may include an operating system 1525 loaded therein. Operating system 1525 may be operable to initiate the execution of the instructions provided by application modules 1522-1524 and/or manage other hardware modules 1580 as well as interfaces with a wireless communication subsystem 1530 which may include one or more wireless transceivers. Operating system 1525 may be adapted to perform other operations across the components of electronic system 1500 including threading, resource management, data storage control and other similar functionality.

Wireless communication subsystem 1530 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 1500 may include one or more antennas 1534 for wireless communication as part of wireless communication subsystem 1530 or as a separate component coupled to any portion of the system. Depending on desired functionality, wireless communication subsystem 1530 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 1530 may permit data to be exchanged with a network, other computer systems, and/or any other devices described herein. Wireless communication subsystem 1530 may include a means for transmitting or receiving data, such as identifiers of HMD devices, position data, a geographic map, a heat map, photos, or videos, using antenna(s) 1534 and wireless link(s) 1532. Wireless communication subsystem 1530, processor(s) 1510, and memory 1520 may together comprise at least a part of one or more of a means for performing some functions disclosed herein.

Embodiments of electronic system 1500 may also include one or more sensors 1590. Sensor(s) 1590 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 1590 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 1500 may include a display module 1560. Display module 1560 may be a near-eye display, and may graphically present information, such as images, videos, and various instructions, from electronic system 1500 to a user. Such information may be derived from one or more application modules 1522-1524, virtual reality engine 1526, one or more other hardware modules 1580, a combination thereof, or any other suitable means for resolving graphical content for the user (e.g., by operating system 1525). Display module 1560 may use liquid crystal display (LCD) technology, light-emitting diode (LED) technology (including, for example, OLED, ILED, AMOLED, TOLED, etc.), light emitting polymer display (LPD) technology, or some other display technology.

Electronic system 1500 may include a user input/output module 1570. User input/output module 1570 may allow a user to send action requests to electronic system 1500. An action request may be a request to perform a particular action. For example, an action request may be to start or end an application or to perform a particular action within the application. User input/output module 1570 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 1500. In some embodiments, user input/output module 1570 may provide haptic feedback to the user in accordance with instructions received from electronic system

1500. For example, the haptic feedback may be provided when an action request is received or has been performed.

Electronic system 1500 may include a camera 1550 that may be used to take photos or videos of a user, for example, for tracking the user's eye position. Camera 1550 may also be used to take photos or videos of the environment, for example, for VR, AR, or MR applications. Camera 1550 may include, for example, a complementary metal-oxide-semiconductor (CMOS) image sensor with a few millions or tens of millions of pixels. In some implementations, camera 1550 may include two or more cameras that may be used to capture 3-D images.

In some embodiments, electronic system 1500 may include a plurality of other hardware modules 1580. Each of other hardware modules 1580 may be a physical module within electronic system 1500. While each of other hardware modules 1580 may be permanently configured as a structure, some of other hardware modules 1580 may be temporarily configured to perform specific functions or temporarily activated. Examples of other hardware modules 1580 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 1580 may be implemented in software. In some implementations, a hardware module 1580 may be used to control the movement of the eye box steering reflector, such as deflector 1030 of FIG. 10.

In some embodiments, memory 1520 of electronic system 1500 may also store a virtual reality engine 1526. Virtual reality engine 1526 may execute applications within electronic system 1500 and receive position information, acceleration information, velocity information, predicted future positions, or some combination thereof of the HMD device from the various sensors. In some embodiments, the information received by virtual reality engine 1526 may be used for producing a signal (e.g., display instructions) to display module 1560. For example, if the received information indicates that the user has looked to the left, virtual reality engine 1526 may generate content for the HMD device that mirrors the user's movement in a virtual environment. Additionally, virtual reality engine 1526 may perform an action within an application in response to an action request received from user input/output module 1570 and provide feedback to the user. The provided feedback may be visual, audible, or haptic feedback. In some implementations, processor(s) 1510 may include one or more GPUs that may execute virtual reality engine 1526.

In various implementations, the above-described hardware and modules may be implemented on a single device or on multiple devices that can communicate with one another using wired or wireless connections. For example, in some implementations, some components or modules, such as GPUs, virtual reality engine 1526, and applications (e.g., tracking application), may be implemented on a console separate from the head-mounted display device. In some implementations, one console may be connected to or support more than one HMD.

In alternative configurations, different and/or additional components may be included in electronic system 1500. Similarly, functionality of one or more of the components can be distributed among the components in a manner different from the manner described above. For example, in some embodiments, electronic system 1500 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium," as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A near-eye display system comprising:
   an image projector comprising:
      an image source configured to display a computer-generated image at a first image plane; and
      an optical projector configured to project the computer-generated image to form an image of the computer-generated image on an intermediate image plane;
   a deflector located at the intermediate image plane, wherein the deflector is configurable based on a location of a pupil of a user's eye to deflect incident light from the image to a corresponding direction; and
   a relay optical subsystem configured to relay the image deflected by the deflector to an exit pupil of the near-eye display system, wherein a location of the exit pupil is at least partially determined by the corresponding direction of the incident light deflected by the deflector and at least partially overlaps with the location of the pupil of the user's eye.

2. The near-eye display system of claim 1, wherein:
   the relay optical subsystem is configured to collimate light from each area of the image; and
   collimated light from different areas of the image exits the exit pupil at different angles.

3. The near-eye display system of claim 1, wherein the deflector comprises a micro-mirror, a prism, a polarization grating, or a diffractive optical element.

4. The near-eye display system of claim 3, further comprising an actuator, the actuator configured to, based on the location of the pupil of the user's eye:
   rotate the deflector; or
   adjust a phase delay pattern of the deflector.

5. The near-eye display system of claim 1, wherein the relay optical subsystem comprises an optical combiner, the optical combiner configured to:
   direct light deflected by the deflector to the exit pupil of the near-eye display system; and
   allow visible light from a field of view in a physical environment to pass through.

6. The near-eye display system of claim 5, wherein the optical combiner comprises a dichroic plate, a prism, a polarization beam combiner, a hologram, a diffractive optical element, or a meta-material combiner.

7. The near-eye display system of claim 6, wherein the meta-material combiner comprises a meta-grating.

8. The near-eye display system of claim 7, wherein:
   a diffraction efficiency of the meta-grating is greater than 20% within a field of view of 40° for visible light; and
   the meta-grating comprises an aperture pattern configured to allow visible light incident from an angular range to pass through.

9. The near-eye display system of claim 1, further comprising:
   an eye-tracking subsystem configured to measure the location of the pupil of the user's eye; and
   an actuator configured to rotate the deflector based on the measured location of the pupil of the user's eye such that the pupil of the user's eye at least partially overlaps with the exit pupil of the near-eye display system.

10. The near-eye display system of claim 1, further comprising:
an eye-tracking subsystem configured to measure the location of the pupil of the user's eye; and
a controller configured to adjust a phase delay pattern of the deflector based on the measured location of the pupil of the user's eye such that the pupil of the user's eye at least partially overlaps with the exit pupil of the near-eye display system.

11. An optical system, comprising:
an image source configured to display computer-generated images;
an optical projector configured to form an image of the image source on an intermediate image plane;
a steerable deflector at the intermediate image plane for deflecting light from the image to target directions; and
an optical combiner configured to:
combine the light from the image deflected by the steerable deflector and light from an environment of the optical system; and
direct the combined light to a pupil of a user's eye.

12. The optical system of claim 11, further comprising:
a controller coupled to the steerable deflector, the controller configured to steer the steerable deflector based on a location of the pupil of the user's eye such that a resultant exit pupil of the optical system at least partially overlaps with the pupil of the user's eye.

13. The optical system of claim 11, further comprising:
a collimation lens between the steerable deflector and the optical combiner, the collimation lens configured to collimate light from each area of the image.

14. The optical system of claim 11, wherein the steerable deflector comprises a micro-electro-mechanical system (MEMS) mirror.

15. The optical system of claim 11, wherein the optical combiner comprises a dichroic plate, a prism, a polarization beam combiner, a hologram, a diffractive optical element, or a meta-grating.

16. A method of eye box steering in a near-eye display device, the method comprising:
determining a location of a pupil of an eye of a user of the near-eye display device;
displaying a computer-generated image (CGI) at a first image plane;
forming an image of the CGI on an intermediate image plane;
configuring a deflector at or near the intermediate image plane based on the determined location of the pupil of the eye of the user;
deflecting, by the deflector, light from the image of the CGI to a relay optic subsystem; and
relaying, by the relay optic subsystem, the image of the CGI to the location of the pupil of the eye of the user.

17. The method of claim 16, further comprising:
transmitting, by the relay optic subsystem, light from a field of view in a surrounding environment to the location of the pupil of the eye of the user.

18. The method of claim 16, wherein configuring the deflector based on the determined location of the pupil of the eye of the user comprises:
determining an rotation angle for the deflector based on the determined location of the pupil of the eye of the user such that a resultant exit pupil of the near-eye display device at least partially overlaps with the pupil of the eye of the user; and
rotating the deflector based on the determined rotation angle.

* * * * *